US009118950B2

(12) United States Patent
Okubo et al.

(10) Patent No.: US 9,118,950 B2
(45) Date of Patent: Aug. 25, 2015

(54) BROADCAST RECEIVING APPARATUS, PLAYBACK APPARATUS, BROADCAST COMMUNICATION SYSTEM, BROADCAST RECEIVING METHOD, PLAYBACK METHOD, AND PROGRAM

(71) Applicant: Panasonic Intellectual Property Corporation of America, Torrance, CA (US)

(72) Inventors: Masafumi Okubo, Kyoto (JP); Tomonori Nakamura, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 138 days.

(21) Appl. No.: 13/988,849

(22) PCT Filed: Oct. 9, 2012

(86) PCT No.: PCT/JP2012/006456
§ 371 (c)(1),
(2) Date: May 22, 2013

(87) PCT Pub. No.: WO2013/061525
PCT Pub. Date: May 2, 2013

(65) Prior Publication Data
US 2014/0090007 A1 Mar. 27, 2014

(30) Foreign Application Priority Data

Oct. 26, 2011 (JP) ................................ 2011-235162

(51) Int. Cl.
*H04N 21/237* (2011.01)
*H04N 21/41* (2011.01)
(Continued)

(52) U.S. Cl.
CPC ............. *H04N 21/41* (2013.01); *H04N 21/237* (2013.01); *H04N 21/23614* (2013.01);
(Continued)

(58) Field of Classification Search
CPC ................... H04N 21/4722; H04N 21/42207; H04N 21/4622; H04N 21/482; H04N 21/8586; H04N 5/4403; H04N 21/4126; H04N 21/4307; H04N 21/4316; H04N 21/6181; H04N 21/8543; H04N 21/858; H04N 5/44591; H04N 21/237; G06F 17/30997
USPC ........... 725/37, 51, 61, 64, 80, 100, 105, 110, 725/120, 133, 139, 141, 151, 153
See application file for complete search history.

(56) References Cited

U.S. PATENT DOCUMENTS 8,341,671 B2 12/2012 Lee et al.
2001/0001160 A1* 5/2001 Shoff et al. ..................... 725/51
(Continued)

FOREIGN PATENT DOCUMENTS

JP 2002-300481 10/2002
JP 2003-018576 1/2003
(Continued)

OTHER PUBLICATIONS

European Search Report issued Nov. 21, 2014 in corresponding European patent application No. 12843568.2.
(Continued)

*Primary Examiner* — Hai V Tran
(74) *Attorney, Agent, or Firm* — Wenderoth, Lind & Ponack, L.L.P.

(57) ABSTRACT

A broadcast receiving apparatus capable of playing back, with another apparatus, a broadcast content item and a communication content item in synchronization with each other is a broadcast receiving apparatus that receives a broadcast content item to be broadcast, and includes: a first information obtaining unit configured to obtain synchronization information for playing back, in synchronization with playback of the broadcast content item, a communication content item to be distributed through communication other than broadcasting; an information notifying unit configured to notify a playback apparatus that plays back the communication content item of the synchronization information; and a broadcast receiving and playback unit configured to receive and play back the broadcast content item.

8 Claims, 19 Drawing Sheets

(51) Int. Cl.
*H04N 21/43* (2011.01)
*H04N 21/462* (2011.01)
*H04N 21/44* (2011.01)
*H04N 21/236* (2011.01)

(52) U.S. Cl.
CPC ...... *H04N 21/4126* (2013.01); *H04N 21/4302* (2013.01); *H04N 21/4307* (2013.01); *H04N 21/44* (2013.01); *H04N 21/4622* (2013.01)

(56) References Cited

U.S. PATENT DOCUMENTS

| | | | |
|---|---|---|---|
| 2002/0162121 A1* | 10/2002 | Mitchell | 725/135 |
| 2007/0050833 A1 | 3/2007 | Park | |
| 2007/0199035 A1* | 8/2007 | Schwartz et al. | 725/110 |
| 2008/0092164 A1 | 4/2008 | Agarwal et al. | |
| 2008/0092201 A1* | 4/2008 | Agarwal et al. | 725/135 |
| 2008/0208839 A1* | 8/2008 | Sheshagiri et al. | 707/5 |
| 2010/0295992 A1 | 11/2010 | Lee et al. | |
| 2011/0164175 A1 | 7/2011 | Chung et al. | |

FOREIGN PATENT DOCUMENTS

| | | |
|---|---|---|
| JP | 2004-235734 | 8/2004 |
| JP | 2005-026867 | 1/2005 |
| JP | 2007-036523 | 2/2007 |
| JP | 2007-068172 | 3/2007 |
| JP | 2007-116669 | 5/2007 |
| JP | 2007-243903 | 9/2007 |
| JP | 2010-516078 | 5/2010 |
| JP | 2010-154523 | 7/2010 |
| JP | 2011-030276 | 2/2011 |
| WO | 03/015414 | 2/2003 |
| WO | WO 03015414 A1 * | 2/2003 |
| WO | 2008/084947 | 7/2008 |

OTHER PUBLICATIONS

Wikipedia: "Interactive television", Jul. 22, 2009, XP55068828, Retrieved from the Internet: URL:http://en.wikipedia.org/w/index.php?title=Interactive television&oldid=303630576 [retrieved on Jul. 1, 2013].

International Search Report issued Dec. 25, 2012 in International Application No. PCT/JP2012/006456.

* cited by examiner

FIG. 4

| | | Communication content item A | Communication content item B | Communication content item C | Synchronization time information 20 |
|---|---|---|---|---|---|
| Identification information | | crid://chZ.com/123 | crid://chZ.com/122 | crid://chZ.com/121 | ... |
| Playback position | | 0x00015F90 | 0x101D5C0 | 0x00015F80 | ... |
| Playback time | | 20:00 | 20:00 | 20:00 | ... |
| Video information | Resolution | 960 × 540 | 1920 × 1080 | 320 × 180 | ... |
| | Bit rate | 1 Mbps | 2 Mbps | 0.5 Mbps | ... |
| | Type of codec | MPEG2 | MPEG4 | MPEG2 | ... |
| | Frame rate | 60 fps | 60 fps | 60 fps | ... |

FIG. 16

| | | |
|---|---|---|
| 321 | Synchronization content information item | |
| | Content ID | crid://chZ.com/123 |
| | URL | http://chZ.com/123.mpg |
| | Codec | MPEG4 |
| | Resolution | 960 × 540 |
| | Bit rate | 1 Mbps |
| | Start — Time | 20:00 |
| | Start — PTS | 0x000015F90 |
| | End — Time | 22:00 |
| | End — PTS | 0x101D5DC0 |
| 801 | Broadcast type | Live |

FIG. 18

| Synchronization content information item | |
|---|---|
| Content ID | crid://chZ.com/123 |
| URL | http://chZ.com/123.mpg |
| Codec | MPEG4 |
| Resolution | 960 × 540 |
| Bit rate | 1 Mbps |
| Start — Time | 20:00 |
| Start — PTS | 0x000015F90 |
| End — Time | 22:00 |
| End — PTS | 0x101D5DC0 |
| Broadcast type | Live |
| Interlocking data | Image.jpg 2011/6/23 20:15-20:30 |

BROADCAST RECEIVING APPARATUS, PLAYBACK APPARATUS, BROADCAST COMMUNICATION SYSTEM, BROADCAST RECEIVING METHOD, PLAYBACK METHOD, AND PROGRAM

TECHNICAL FIELD

The present invention relates to a broadcast receiving apparatus that receives a broadcast content item to be broadcast, and in particular to a broadcast receiving apparatus, a playback apparatus, a system, and others that play back a communication content item to be distributed through communication other than broadcasting, in synchronization with playback of the broadcast content item.

BACKGROUND ART

In recent years, television receivers (hereinafter referred to as TVs) capable of downloading content items using communication called "Internet television" or "smart TV" and playing back the content items are becoming mainstream (for example, see Patent Literatures (hereinafter referred to as PTLs) 1 and 2)

For example, such a TV is included in a broadcast receiving apparatus that receives a broadcast content item and is connected to the Internet. The TV searches for a video that is a desired communication content via the connected Internet, and downloads and plays back the video. Furthermore, an on-demand TV receives a content item streaming-distributed from a video/music distribution site, and plays back the content. The TV downloads and executes an application program, such as a game and a utility, and has a communication function, such as a social network service.

Furthermore, a content item of a digital broadcast received by a digital broadcast receiver in a household or a digital content item stored in a recorder is transmitted to a room different from the room in which the digital broadcast receiver or the recorder is placed, using a home network, and the content is viewed in the different room.

There is an increasing tendency to enable sharing of a digital content item between all the devices connected to a home network, using the home network. Specifically, there is an increasing tendency to enable the sharing not only between all the devices such as consumer electronics (CE) devices including a television receiver and a digital video recorder (DVR), but also between all the devices that include a personal computer (PC) and a mobile information terminal called a personal digital assistant (PDA) and are connected to the home network. More specifically, the standard organizations such as the Digital Living Network Alliance (DLNA) define and release the standards and guidelines for implementing such sharing.

Here, the standard defined in the Universal Plug and Play (UPnP) AV Architecture is used for identifying devices and exchanging information on available content items, between a server on a home network (for example, a set-top box (STB) or a DVR that receives a digital broadcast) and a client (for example, a personal computer or a digital player). According to the UPnP AV, in response to an inquiry from the client, the server returns a list of provided content items and attribute information of each of the content items. Furthermore, the DLNA uses the Hypertext Transfer Protocol (HTTP) as a required protocol for communicating content data.

CITATION LIST

Patent Literature

[PTL 1] Japanese Unexamined Patent Application Publication No 2007-68172

[PTL 2] Japanese Unexamined Patent Application Publication No. 2005-26867

SUMMARY OF INVENTION

Technical Problem

The broadcast receiving apparatuses in PTLs 1 and 2 have, however, a problem of incapability of playing back, with another apparatus, a broadcast content item and a communication content item in synchronization with each other.

Thus, the present invention provides a broadcast receiving apparatus capable of playing back, with another apparatus, a broadcast content item and a communication content item in synchronization with each other.

Solution to Problem

The broadcast receiving apparatus according to an aspect of the present invention is a broadcast receiving apparatus that receives a broadcast content item to be broadcast, and includes: a first information obtaining unit configured to obtain synchronization information for playing back, in synchronization with playback of the broadcast content item, a communication content item to be distributed through communication other than broadcasting; an information notifying unit configured to notify a playback apparatus that plays back the communication content item of the synchronization information; and a broadcast receiving and playback unit configured to receive and play back the broadcast content item.

These general or specific aspects of the present invention may be implemented by a system, a method, an integrated circuit, a computer program, a computer-readable recording medium, such as a CD-ROM, or an arbitrary combination of the system, the method, the integrated circuit, the computer program, and the recording medium.

Advantageous Effects of Invention

The broadcast receiving apparatus according to the present invention can play back, with another apparatus, a broadcast content item and a communication content item in synchronization with each other.

BRIEF DESCRIPTION OF DRAWINGS

FIG. 4 shows an example of synchronization time information according to Embodiment 1.

FIG. 16 shows an example of a synchronization content information item according to Variation 1 of Embodiment 2.

FIG. 18 shows an example of a synchronization content information item according to Variation 2 of Embodiment 2.

Figure 1:
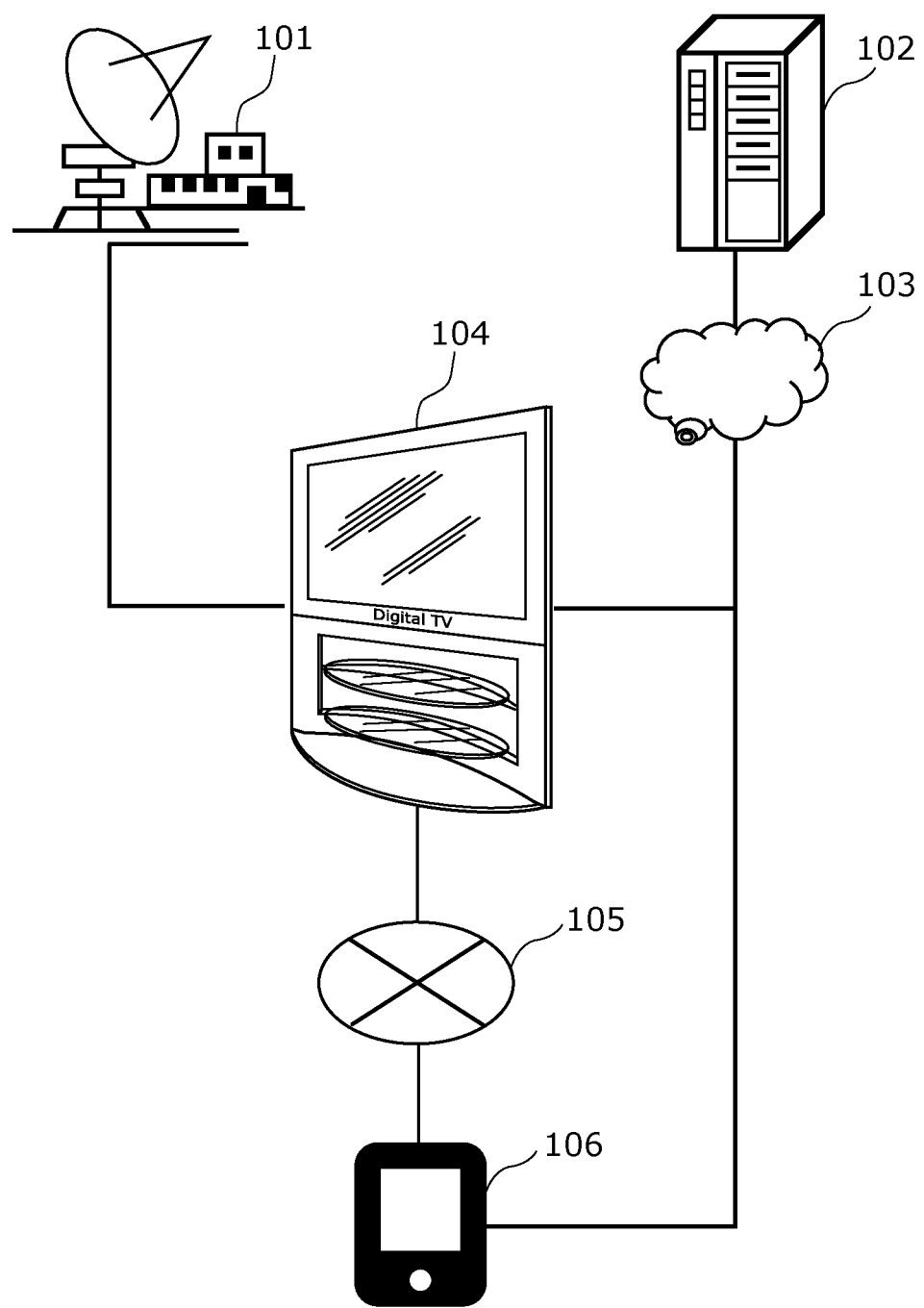
FIG. 1 illustrates a system including a TV including a broadcast receiving apparatus according to Embodiment 1.

DESCRIPTION OF EMBODIMENTS (Knowledge on which the Present Invention is Based)

The Inventors have found that the broadcast receiving apparatuses of PTLs 1 and 2 described in the Background Art have the following problems.

The broadcast receiving apparatus of PTL 1 plays back a broadcast content item and a communication content item in synchronization with each other. More specifically, the broadcast receiving apparatus starts receiving a communication content item before a broadcast start time of a broadcast content item, so that it plays back the broadcast content item and the communication content item in synchronization with each other. In other words, information on the communication content item is superimposed on a broadcast signal before the broadcast start time, and the signal is broadcast. Here, the broadcast receiving apparatus can start receiving the communication content item before the broadcast content item by obtaining the information beforehand. The broadcast receiving apparatus plays back the broadcast content item and the communication content item in synchronization with each other in itself.

However, when another apparatus that is a playback apparatus that receives and plays back a communication content item cannot receive a broadcast signal, it cannot obtain information on the communication content item superimposed on in the broadcast signal. Thus, even when the broadcast receiving apparatus of PTL 1 tries to play back a broadcast content item and a communication content item in synchronization with each other with the playback apparatus that is the other apparatus, it cannot do that.

Furthermore, the broadcast receiving apparatus of PTL 2 obtains information on a communication content item from an electronic program guide (EPG) to be broadcast. Thus, the broadcast receiving apparatus obtains the information on the communication content item before selecting a program to be broadcast, and plays back a broadcast content item and the communication content item in synchronization with each other, using the obtained information in itself.

However, when another apparatus that is a playback apparatus that receives and plays back a communication content item cannot receive a broadcast signal, it cannot obtain information on the communication content item from the EPG to be broadcast. Thus, even when the broadcast receiving apparatus of PTL 2 tries to play back a broadcast content item and a communication content item in synchronization with each other with the playback apparatus that is the other apparatus, it cannot do that as the broadcast receiving apparatus of PTL 1.

In order to solve such problems, the broadcast receiving apparatus according to an aspect of the present invention is a broadcast receiving apparatus that receives a broadcast content item to be broadcast, and includes: a first information obtaining unit configured to obtain synchronization information for playing back, in synchronization with playback of the broadcast content item, a communication content item to be distributed through communication other than broadcasting; an information notifying unit configured to notify a playback apparatus that plays back the communication content item of the synchronization information; and a broadcast receiving and playback unit configured to receive and play back the broadcast content item.

Accordingly, since the synchronization information is notified to the playback apparatus, the playback apparatus can play back the communication content item in synchronization with playback of the broadcast content item by the broadcast receiving apparatus, based on the synchronization information.

Furthermore, the synchronization information may be one of (i) synchronization time information indicating, in association with each other, a playback position in the communication content item and a playback time at which data at the playback position is to be played back and (ii) a uniform resource locator (URL) indicating a source of the synchronization time information.

Accordingly, when the synchronization information is the synchronization time information, the playback apparatus can promptly obtain the synchronization time information, and play back the communication content item in synchronization with playback of the broadcast content item. Furthermore, when the synchronization information is the URL, the amount of data to be transmitted from the broadcast receiving apparatus to the playback apparatus can be suppressed.

Furthermore, the synchronization time information may further include identification information for identifying the communication content item.

Accordingly, the playback apparatus can select and receive the optimal one of the communication content items related to the broadcast content item, according to the identification information.

Furthermore, the information notifying unit may be configured to notify the playback apparatus of the synchronization time information on the communication content item that meets capability of the playback apparatus, the communication content item being included in a plurality of communication content items. For example, the capability of the playback apparatus is at least one of a size of a display of the playback apparatus on which the communication content item is to be displayed, capability for playing back the communication content item by the playback apparatus, and a size of a memory held in the playback apparatus.

Accordingly, the playback apparatus can receive and play back the communication content item according to the capability of the playback apparatus.

Furthermore, the synchronization time information may indicate, for each of communication content items, a playback position and a playback time of the communication content item, and video information on specification of the communication content item. For example, the video information is at least one of a resolution, a bit rate, a type of codec, and a frame rate of the communication content item.

Accordingly, the playback apparatus can select the communication content item to be played back from among the communication content items, and appropriately play back the selected communication content based on the video information for the communication content item.

Furthermore, the broadcast receiving apparatus may further include a viewing mode determining unit configured to determine one of (i) a first viewing mode in which the broadcast content item and the communication content item that are displayed on a same device are not viewed and (ii) a second viewing mode in which the broadcast content item and the communication content item that are displayed on the same device are viewed, wherein the information notifying unit may be configured to notify the synchronization information, when the viewing mode determining unit determines the first viewing mode. Here, the broadcast receiving apparatus may further include: a communication receiving and playback unit configured to receive and play back the communication content item, when the viewing mode determining unit determines the second viewing mode; and a superimposing unit configured to superimpose a communication video that is a video obtained through playing back of the communication content item and a broadcast video that is a video obtained through playing back of the broadcast content item, and output an image in which the communication video and the broadcast video are superimposed.

Accordingly, since the viewing mode for synchronized playback of the broadcast content item and the communication content item is switched, the viewing mode according to a state of the user can be implemented.

Furthermore, the broadcast receiving apparatus may further include a viewing mode receiving unit configured to receive a viewing mode, wherein the viewing mode determining unit may be configured to determine one of the first viewing mode and the second viewing mode according to the viewing mode received by the viewing mode receiving unit, irrespective of whether or not the broadcast content item and the communication content item are being played back.

Accordingly, upon receipt of a viewing mode according to an operation of the user, a viewing mode desired by the user can be selected.

Furthermore, the broadcast receiving apparatus may further include a communication state obtaining unit configured to obtain communication state information indicating a communication state of the playback apparatus other than the broadcasting, wherein the information notifying unit may be configured to notify the playback apparatus of another synchronization information for playing back a communication content item in synchronization with playback of a part of the broadcast content item, the part being played back by the broadcast receiving and playback unit after a state indicated by the communication state information is switched from a reception capable state in which the communication content item can be received to a state in which the communication content item cannot be received, and is back to the reception capable state, while the broadcast receiving and playback unit plays back the broadcast content item.

Accordingly, when the communication state other than broadcasting is restored to the normal state, it is possible to appropriately resume the synchronization of the content items according to the synchronization information.

Furthermore, the broadcast receiving apparatus may further include a location information obtaining unit configured to obtain location information indicating a location of a communication content item representing a video of a continuation of the broadcast content item, wherein the information notifying unit may be configured to notify the playback apparatus of the location information when the broadcast receiving and playback unit finishes playing back the broadcast content item.

Accordingly, the playback apparatus can receive the communication content item indicating the video as the continuation of the broadcast content item, from the location indicated by the location information. Thus, the user can view the communication content item played back by the playback apparatus as the continuation of the broadcast content item. As a result, the convenience of the user can be improved.

Furthermore, the broadcast receiving apparatus may further include a location information obtaining unit configured to obtain location information indicating a location of a communication content item representing a video identical to a video of the broadcast content item, wherein the information notifying unit may be configured to notify the playback apparatus of the location information, upon receipt of an instruction from the playback apparatus after the broadcast receiving and playback unit starts playing back the broadcast content item.

Accordingly, the playback apparatus can receive the communication content item indicating the same video as that of the broadcast content item, from the location indicated by the location information. Accordingly, even when the user misses the first portion of a broadcast content item, the user can view the communication content item played back by the playback apparatus from the beginning as the missed first portion, and the convenience of the user can be improved.

In order to solve the problems, the playback apparatus according to an aspect of the present invention is a playback apparatus that plays back a communication content item to be distributed through communication other than broadcasting, and includes: a second information obtaining unit configured to obtain synchronization information for playing back the communication content item, in synchronization with playback of a broadcast content item to be broadcast; and a communication receiving and playback unit configured to receive and play back the communication content item according to the synchronization information obtained by the second information obtaining unit.

Since the communication content item is played back according to the synchronization information, the communication content item can be played back in synchronization with playback of the broadcast content item by the broadcast receiving apparatus.

In order to solve the problems, the broadcast communication system according to an aspect of the present invention is a broadcast communication system including: a broadcast receiving apparatus that receives a broadcast content item to be broadcast; and a playback apparatus that plays back a communication content item to be distributed through communication other than broadcasting, the broadcast receiving apparatus including: a first information obtaining unit configured to obtain synchronization information for playing back the communication content item in synchronization with playback of the broadcast content item; an information notifying unit configured to notify the playback apparatus of the synchronization information; and a broadcast receiving and playback unit configured to receive and play back the broadcast content item, and the playback apparatus including: a second information obtaining unit configured to obtain the synchronization information from the broadcast receiving apparatus; and a communication receiving and playback unit configured to receive and play back the communication content item according to the synchronization information obtained by the second information obtaining unit.

Even when the playback apparatus cannot directly obtain the synchronization information, the broadcast receiving apparatus notifies the playback apparatus of the synchronization information. Thus, the broadcast content item and the communication content item can be played back in synchronization with each other between the broadcast receiving apparatus and the playback apparatus.

In order to solve the problems, the broadcast communication system according to an aspect of the present invention is a broadcast communication system including: a broadcast receiving apparatus that receives a broadcast content item to be broadcast; and a playback apparatus that plays back a communication content item to be distributed through communication other than broadcasting, the broadcast receiving apparatus including a broadcast receiving and playback unit configured to receive and play back the broadcast content item, and the playback apparatus including: an information obtaining unit configured to obtain synchronization information for playing back the communication content item in synchronization with playback of the broadcast content item, without being through the broadcast receiving apparatus; and a communication receiving and playback unit configured to receive and play back the communication content item according to the synchronization information obtained by the information obtaining unit.

Since the playback apparatus directly obtains the synchronization information, the broadcast content item and the communication content item can be played back in synchronization with each other between the broadcast receiving apparatus and the playback apparatus.

The present invention can be implemented not only as such a broadcast receiving apparatus, a playback apparatus, or a broadcast communication system but also as an integrated circuit, as a method of operations performed by these apparatuses, as a program causing a computer to execute the operations, or as a recording medium for storing the program.

Hereinafter, Embodiments of the present invention will be described with reference to the drawings.

Embodiments to be described below are all general or specific examples. The values, shapes, materials, constituent elements, positions and connections of the constituent elements, steps, and orders of the steps indicated in Embodiments are examples, and do not limit the present invention. Furthermore, the constituent elements in Embodiments that are not described in independent Claims that describe the most generic concept of the present invention are described as arbitrary constituent elements.

(Embodiment 1)

FIG. 1 illustrates a system including a TV including a broadcast receiving apparatus according to Embodiment 1.

The system is a broadcast/communication integrating system in which broadcast and communication have been integrated, and includes a broadcast station 101 that broadcasts a broadcast content item, a TV 104, a server 102 that distributes a communication content item, an Internet connection 103, a mobile device 106, and a home network 105 that connects the TV 104 to the mobile device 106. The broadcast station 101 superimposes a broadcast content item on broadcast waves or a broadcast signal, and broadcasts the broadcast content item. The server 102 transmits a communication content item to the TV 104 and the mobile device 106 via the Internet connection 103.

The TV 104 includes a broadcast receiving apparatus according to Embodiment 1 and a display. The broadcast receiving apparatus receives and plays back the broadcast content item, and displays, on a display of the TV 104, a broadcast video that is a video obtained through playing back of the broadcast content item. The mobile device 106 is, for example, a smartphone, and includes a playback apparatus according to Embodiment 1 and a display. The playback apparatus receives a communication content item to be distributed from the server 102 via the Internet connection 103 and plays back the communication content item, and displays, on the display of the mobile device 106, a communication video that is a video obtained by playing back of the communication content item. Furthermore, the TV 104 and the mobile device 106 communicate via the home network 105. In such a system, each of the TV 104 and the mobile device 106 plays back a broadcast content item and a communication content item in synchronization with each other. Here, the broadcast video is displayed on the display of the TV 104, and the communication video is displayed on the display of the mobile device 106.

Although the TV 104 includes the broadcast receiving apparatus and the mobile device 106 includes the playback apparatus according to Embodiment 1, each of the broadcast receiving apparatus and the playback apparatus may be included in other apparatuses or devices. According to Embodiment 1, the broadcast receiving apparatus of the TV 104 and the playback apparatus of the mobile device 106 mainly consist of a broadcast communication system.

Figure 2:
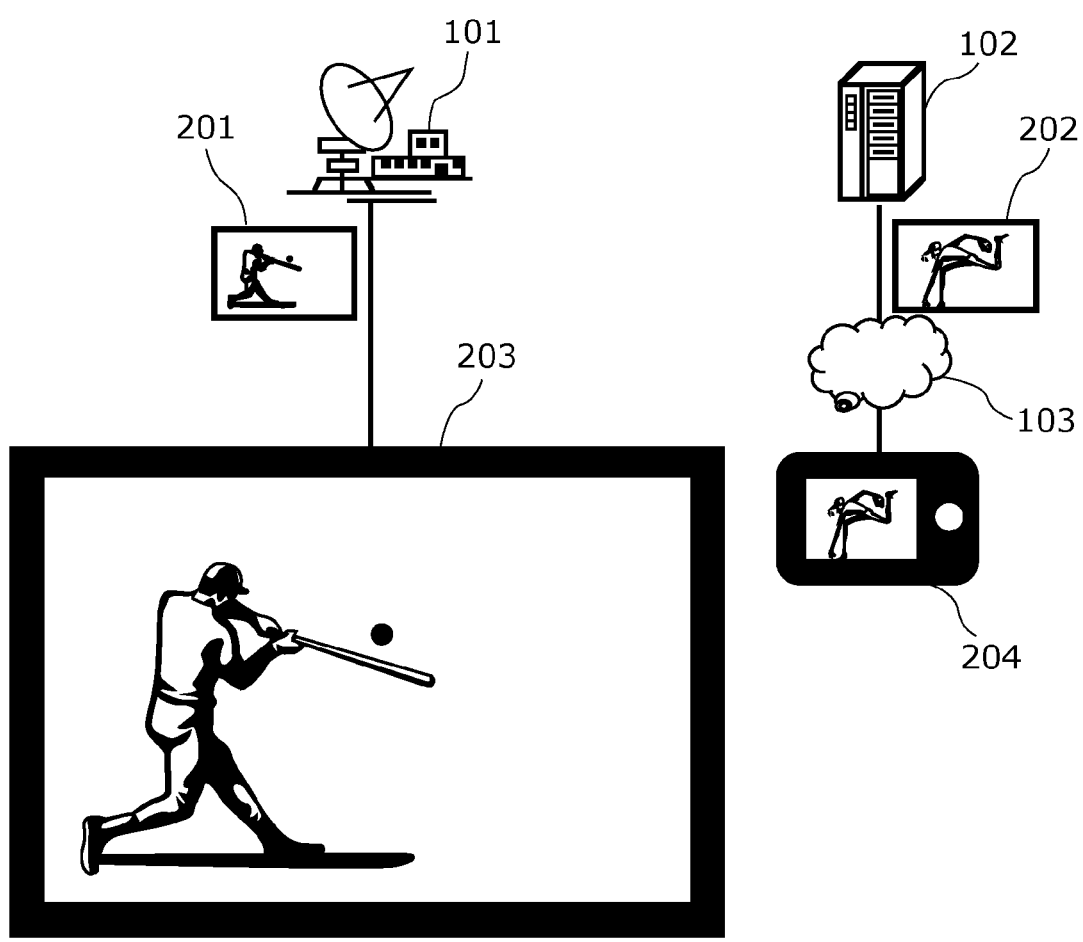
FIG. 2 illustrates an example of a broadcast video and a communication video to be displayed on a TV and a mobile device, respectively according to Embodiment 1.

FIG. 2 illustrates an example of a broadcast video and a communication video to be displayed on the TV 104 and the mobile device 106, respectively.

For example, synchronized playback of a broadcast content item and a communication content item enables multi-angle viewing of a baseball game live. The broadcast receiving apparatus receives a broadcast content item 201 to be broadcast from the broadcast station 101, and outputs a broadcast video of the broadcast content item 201 to a display 203 of the TV 104. The playback apparatus receives a communication content item 202 to be distributed from the server 102 via the Internet connection 103, and outputs a communication video of the communication content item 202 to a display 204 of the mobile device 106. The broadcast content item 201 indicates a video captured from an angle of a batter, and the communication content item 202 indicates a video captured from an angle of a pitcher. As such, the communication content item complements elements that cannot be expressed solely by the broadcast content item, thus conveying to the viewer a greater sense of realism. The mobile device 106 may obtain and output, as a communication content item, voice or subtitles in a language that is/are not included in the broadcast content item 201, special video, and others when the broadcast content item and the communication content item are played back in synchronization with each other.

Figure 3:
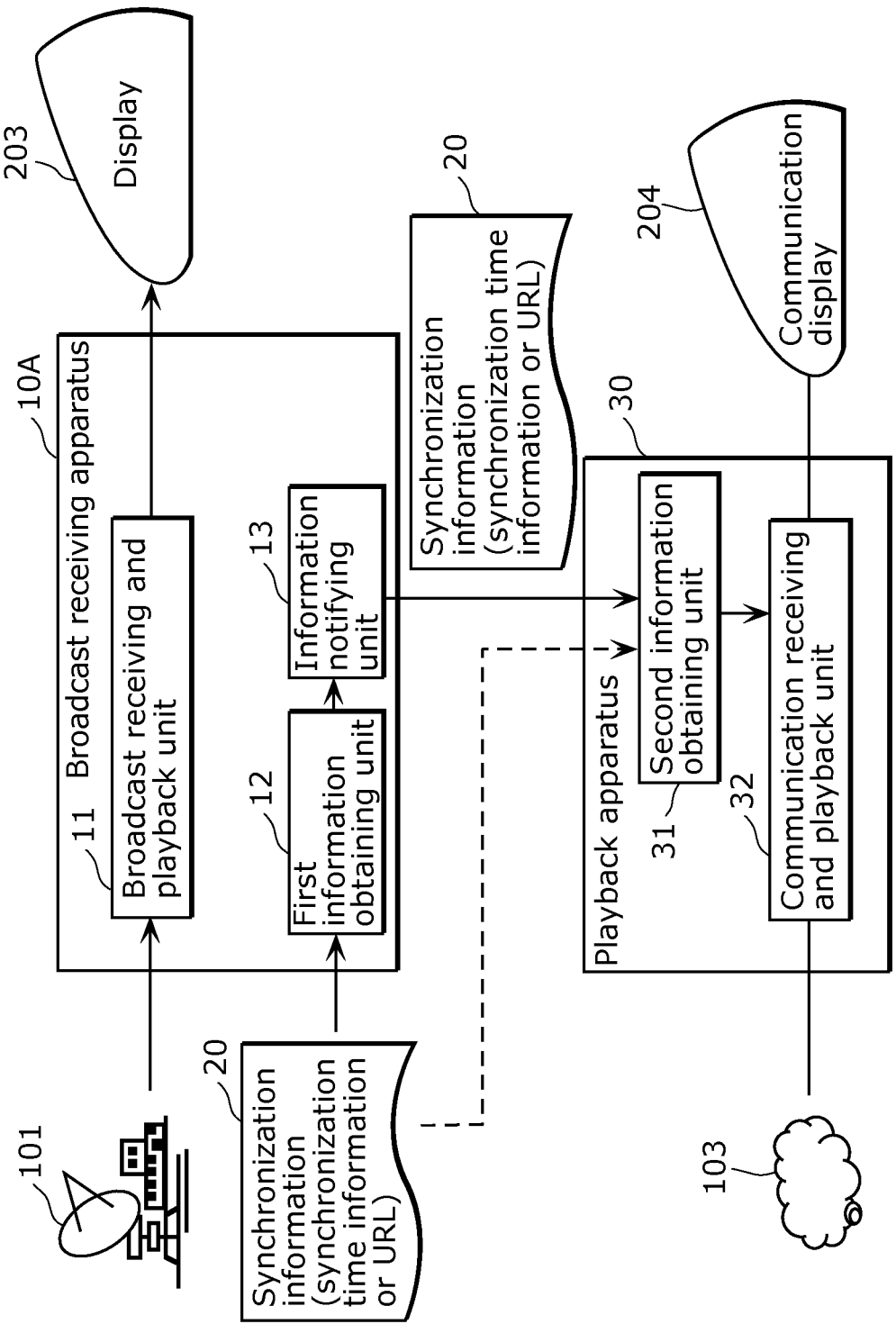
FIG. 3 illustrates a configuration of a broadcast communication system according to Embodiment 1.

FIG. 3 illustrates a configuration of a broadcast communication system according to Embodiment 1.

The broadcast communication system includes a broadcast receiving apparatus 10A that receives a broadcast content item to be broadcast and a playback apparatus 30 that plays back a communication content item to be distributed through communication other than broadcasting. The TV 104 includes the broadcast receiving apparatus 10A, and the mobile device 106 includes the playback apparatus 30. Furthermore, the communication other than broadcasting is communication via, for example, the Internet connection 103, and will be simply referred to as communication.

The broadcast receiving apparatus 10A includes: a first information obtaining unit 12 that obtains synchronization information 20 for playing back a communication content item to be distributed through communication other than broadcasting, in synchronization with a broadcast content item; an information notifying unit 13 that notifies the playback apparatus 30 of the synchronization information 20; and a broadcast receiving and playback unit 11 that receives and plays back the broadcast content item. For example, the first information obtaining unit 12 obtains the synchronization information 20 to be broadcast.

The playback apparatus 30 includes a second information obtaining unit 31 that obtains the synchronization information 20 for playing back the communication content item in synchronization with playback of the broadcast content item to be broadcast, and a communication receiving and playback unit 32 that receives and plays back the communication content item according to the synchronization information 20 obtained by the second information obtaining unit 31. Here, the second information obtaining unit 31 obtains the synchronization information 20 from the broadcast receiving apparatus 10A that receives the broadcast content item.

As such, the broadcast receiving apparatus 10A notifies the playback apparatus 30 of the synchronization information 20 according to Embodiment 1. Thus, even when the playback apparatus 30 cannot directly obtain the synchronization information 20, that is, even when the playback apparatus 30 does not include a function of receiving a broadcast, the playback apparatus 30 can play back the communication content item in synchronization with playback of the broadcast content item by the broadcast receiving apparatus 10A, based on the synchronization information 20.

Furthermore, the synchronization information 20 is one of (i) synchronization time information indicating, in association with each other, a playback position in the communication content item and a playback time at which data at the playback position is to be played back and (ii) a uniform resource locator (URL) indicating a source of the synchronization time information.

Accordingly, when the synchronization information 20 is the synchronization time information, the playback apparatus 30 can promptly obtain the synchronization time information to play back the communication content item in synchronization with the broadcast content item. Furthermore, when the synchronization information 20 is a URL, the amount of data to be transmitted from the broadcast receiving apparatus 10A to the playback apparatus 30 can be suppressed.

FIG. 4 shows an example of the synchronization time information 20 according to Embodiment 1.

As shown in FIG. 4, the synchronization time information 20 indicates, for each of communication content items, identification information for identifying the communication content item, a playback position and a playback time of the communication content item, and video information on specification of the communication content item. Here, the video information includes a resolution, a bit rate, a type of codec, and a frame rate of the communication content item.

Accordingly, even with a plurality of communication content items related to a broadcast content item, the playback apparatus 30 can select the optimal communication content from among the communication content items and receive the optimal communication content item according to Embodiment 1.

Furthermore, the playback apparatus 30 can select a communication content item to be played back, from among the communication content items, and appropriately play back the selected communication content based on the video information on the communication content item.

Here, the information notifying unit 13 may notify the playback apparatus 30 of the synchronization time information 20 solely on one of the communication content items that meets the capability of the playback apparatus 30. For example, the capability of the playback apparatus 30 is at least one of a size of a display of the playback apparatus 30 on which the communication content item is to be displayed, capability for the playback apparatus 30 playing back the communication content item, and a size of a memory held in the playback apparatus 30.

Accordingly, the playback apparatus 30 can receive and play back the communication content item according to the capability of the playback apparatus 30.

Figure 5:
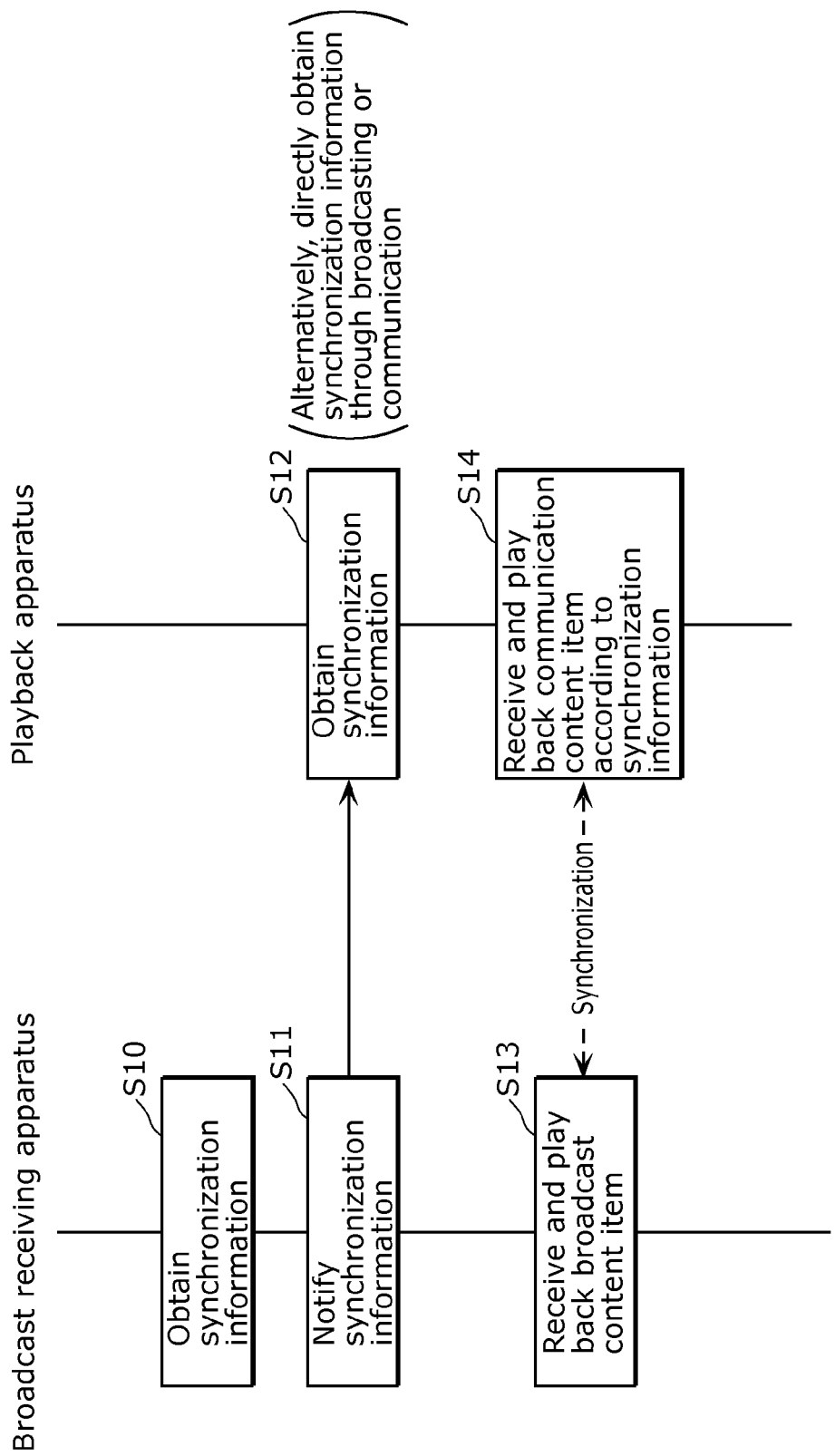
FIG. 5 is a sequence diagram showing operations of the broadcast communication system according to Embodiment 1.

FIG. 5 is a sequence diagram illustrating operations of the broadcast communication system according to Embodiment 1.

First, the broadcast receiving apparatus 10A obtains the synchronization information 20 for playing back a communication content item in synchronization with playback of a broadcast content item (Step S10). Next, the broadcast receiving apparatus 10A notifies the playback apparatus 30 of the synchronization information 20 (Step S11). The playback apparatus 30 obtains the synchronization information 20 from the broadcast receiving apparatus 10A (Step S12). The playback apparatus 30 may directly obtain the synchronization information 20 through broadcasting or communication.

Then, the broadcast receiving apparatus 10A receives and plays back the broadcast content item (Step S13). The playback apparatus 30 receives and plays back the communication content item according to the synchronization information 20 obtained at Step S12 (Step S14). Accordingly, the playback apparatus 30 plays back the communication content item in synchronization with playback of the broadcast content item by the broadcast receiving apparatus 10A.

(Variation 1)

Next, Variation 1 of Embodiment 1 will be described. A broadcast communication system according to Variation 1 features changing a viewing mode.

Figure 6:
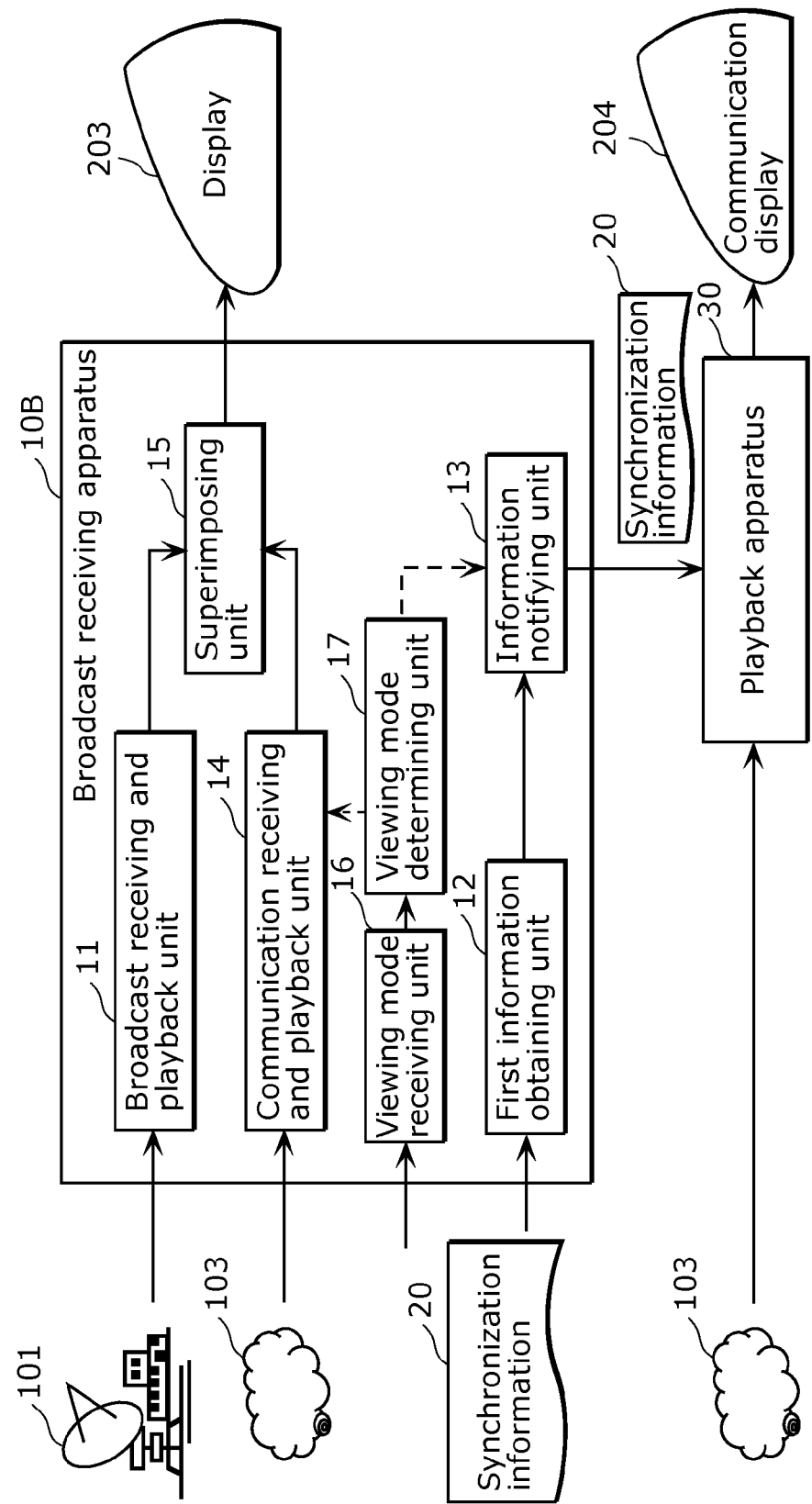
FIG. 6 illustrates a configuration of a broadcast communication system according to Variation 1 of Embodiment 1.

FIG. 6 illustrates a configuration of the broadcast communication system according to Variation 1.

A broadcast receiving apparatus 10B of the broadcast communication system according to Variation 1 includes the constituent elements included in the broadcast receiving apparatus 10A, and additionally includes a viewing mode receiving unit 16, a viewing mode determining unit 17, a communication receiving and playback unit 14, and a superimposing unit 15.

The viewing mode receiving unit 16 receives a viewing mode according to, for example, an operation by the user. The viewing mode determining unit 17 determines one of (i) a first viewing mode in which the broadcast content item and the communication content item that are displayed on a same device are not viewed and (ii) a second viewing mode in which the broadcast content item and the communication content item that are displayed on the same device are viewed. Here, the viewing mode determining unit 17 determines one of the first and second viewing modes according to the viewing mode received by the viewing mode receiving unit 16, irrespective of whether or not the broadcast content item and the communication content item are being played back.

When the viewing mode determining unit 17 determines the first viewing mode, the information notifying unit 13 notifies the synchronization information 20. When the viewing mode determining unit 17 determines the second viewing mode, the communication receiving and playback unit 14 receives and plays back the communication content item. The superimposing unit 15 superimposes a communication video that is a video obtained through playing back of the communication content item and a broadcast video that is a video obtained through playing back of the broadcast content item, and outputs an image in which the communication video and the broadcast video are superimposed.

Accordingly, since the viewing mode for synchronized playback of a broadcast content item and a communication content item is switched, the viewing mode according to a state of the user can be implemented. In other words, upon receipt of a viewing mode according to an operation of the user, a viewing mode desired by the user can be reliably selected.

(Variation 2)

Variation 2 of Embodiment 1 will be hereinafter described. A broadcast communication system according to Variation 2 features complementing a continuation of a broadcast content item or a video of the broadcast content item missed by the user, with a communication content item.

Figure 7:
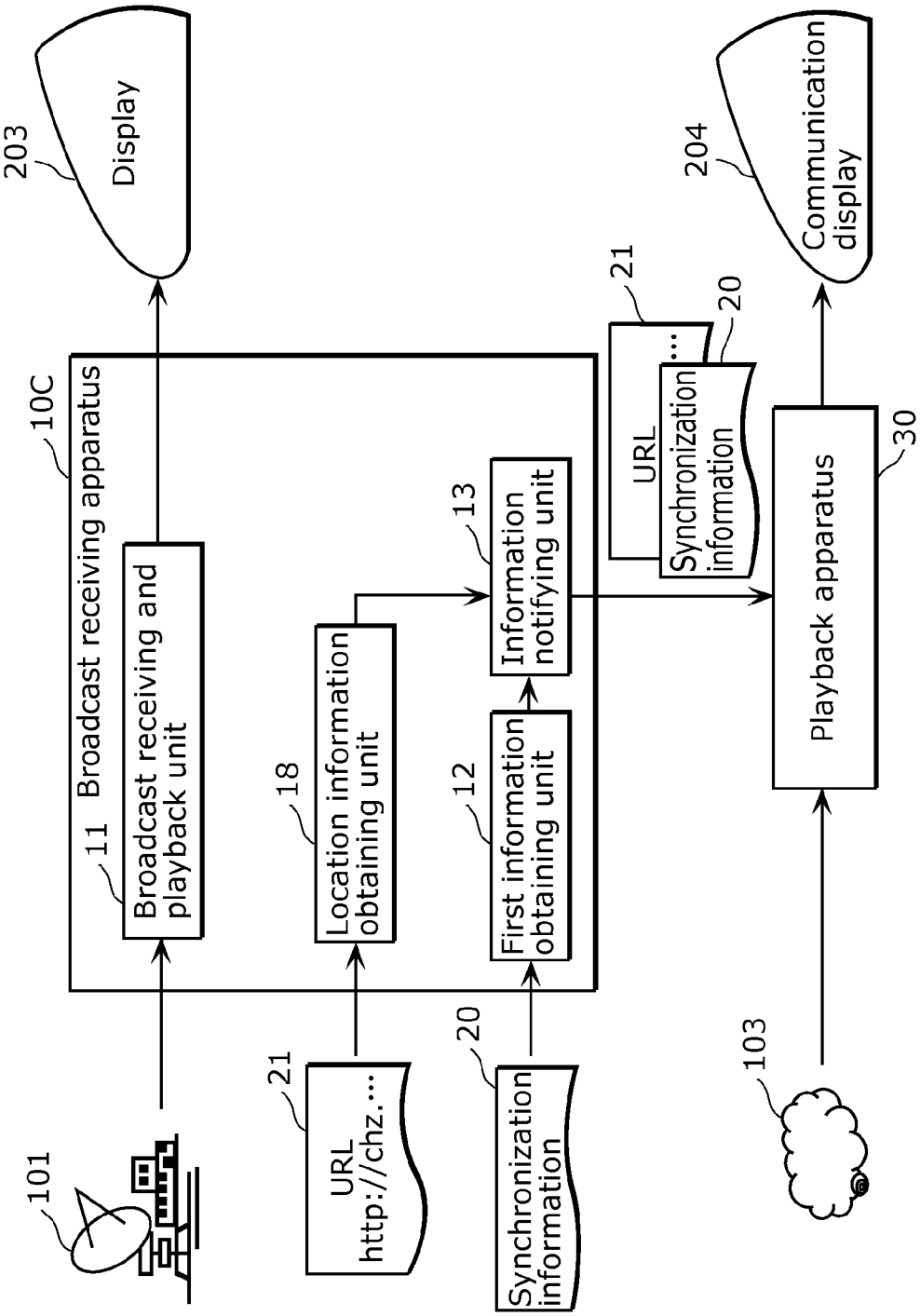
FIG. 7 illustrates a configuration of a broadcast communication system according to Variation 2 of Embodiment 1.

FIG. 7 illustrates a configuration of the broadcast communication system according to Variation 2.

A broadcast receiving apparatus 10C of the broadcast communication system according to Variation 2 includes the constituent elements included in the broadcast receiving apparatus 10A, and additionally includes a location information obtaining unit 18.

The location information obtaining unit 18 obtains location information 21 indicating a location of a communication content item representing a video of the continuation of a broadcast content item. Once the broadcast receiving and playback unit 11 finishes playing back the broadcast content item, the information notifying unit 13 notifies the playback apparatus 30 of the location information 21.

Accordingly, the playback apparatus 30 can receive the communication content item representing the video of the continuation of the broadcast content item, from the location indicated by the location information 21. Thus, the user can view the communication content item played back by the playback apparatus 30, as the continuation of the broadcast content item. As a result, the convenience of the user can be improved.

Here, the location information obtaining unit 18 may obtain the location information 21 indicating a location of a communication content item representing a video identical to a video of the broadcast content item. Upon receipt of an instruction from the playback apparatus 30 after the broadcast receiving and playback unit 11 starts playing back the broadcast content item, the information notifying unit 13 notifies the playback apparatus 30 of the location information 21.

Accordingly, the playback apparatus 30 can receive the communication content item representing the video identical to the video of the broadcast content item, from the location indicated by the location information 21. Accordingly, even when the user misses the first portion of a broadcast content item, the user can view the communication content item from the beginning as the missed first portion, and the convenience of the user can be improved.

Here, the location information 21 may be included in the synchronization information 20.

(Variation 3)

Variation 3 of Embodiment 1 will be hereinafter described. A broadcast receiving apparatus according to Variation 3 features processing according to a communication state of the playback apparatus 30.

Figure 8:
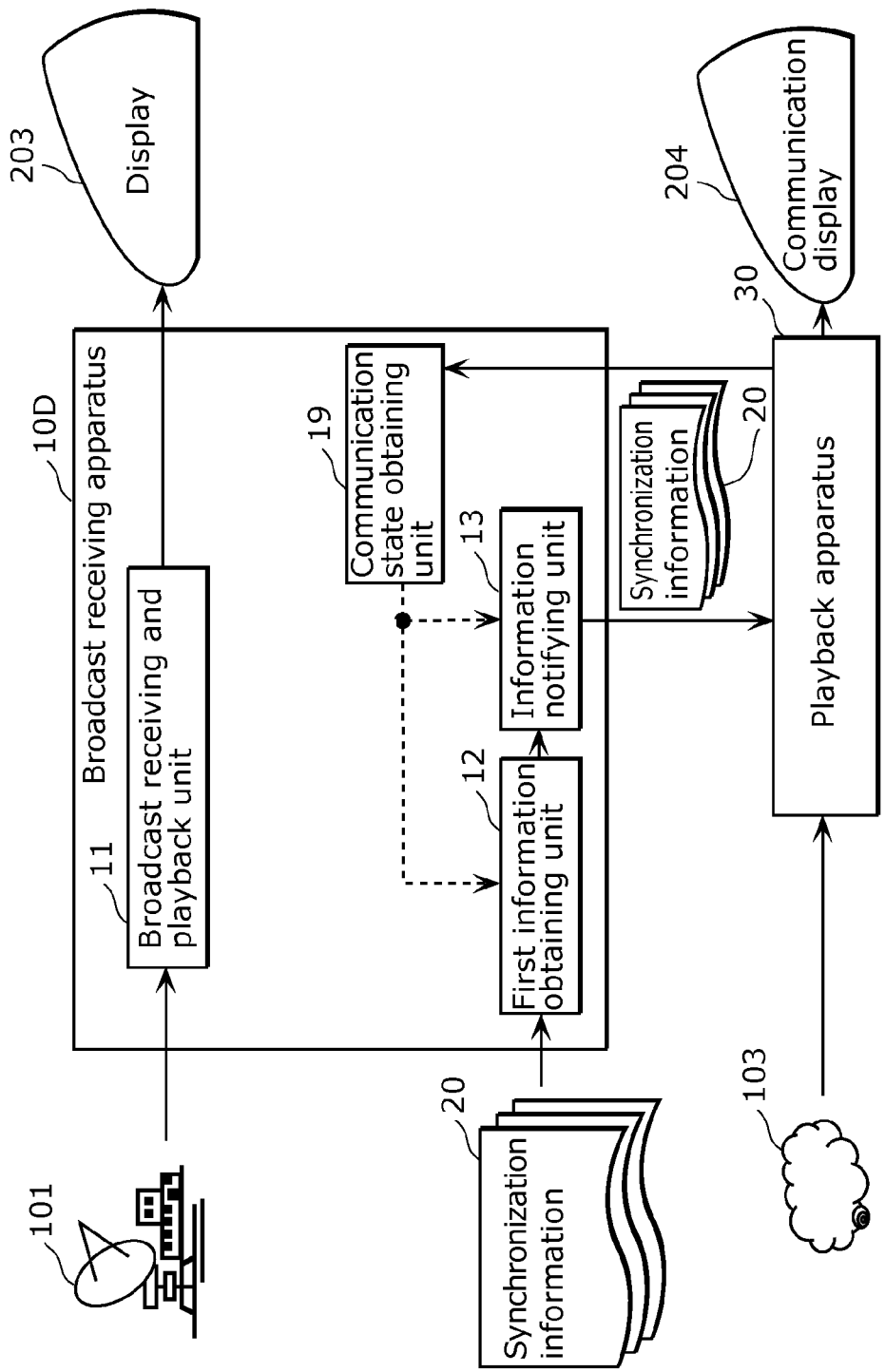
FIG. 8 illustrates a configuration of a broadcast communication system according to Variation 3 of Embodiment 1.

FIG. 8 illustrates a configuration of the broadcast communication system according to Variation 3.

A broadcast receiving apparatus 10D of the broadcast communication system according to Variation 3 includes the constituent elements included in the broadcast receiving apparatus 10A, and additionally includes a communication state obtaining unit 19.

The communication state obtaining unit 19 obtains communication state information indicating a communication state of the playback apparatus 30 other than broadcasting.

Here, while the broadcast receiving and playback unit 11 plays back a broadcast content item, there are cases where the communication state indicated by the communication state information is switched from a reception capable state in which a communication content item can be received to a state in which the communication content item cannot be received, and is back to the reception capable state. Here, the information notifying unit 13 notifies the playback apparatus 30 of another synchronization information 20 to synchronize the communication content item with a part of the broadcast content item to be played back by the broadcast receiving and playback unit 11 after the communication state is back to the reception capable state.

Accordingly, when the communication state is restored to the normal state, it is possible to appropriately resume the synchronization of the content items according to the synchronization information 20.

(Embodiment 2)

Embodiment 2 will describe details of a broadcast receiving apparatus.

Figure 9:
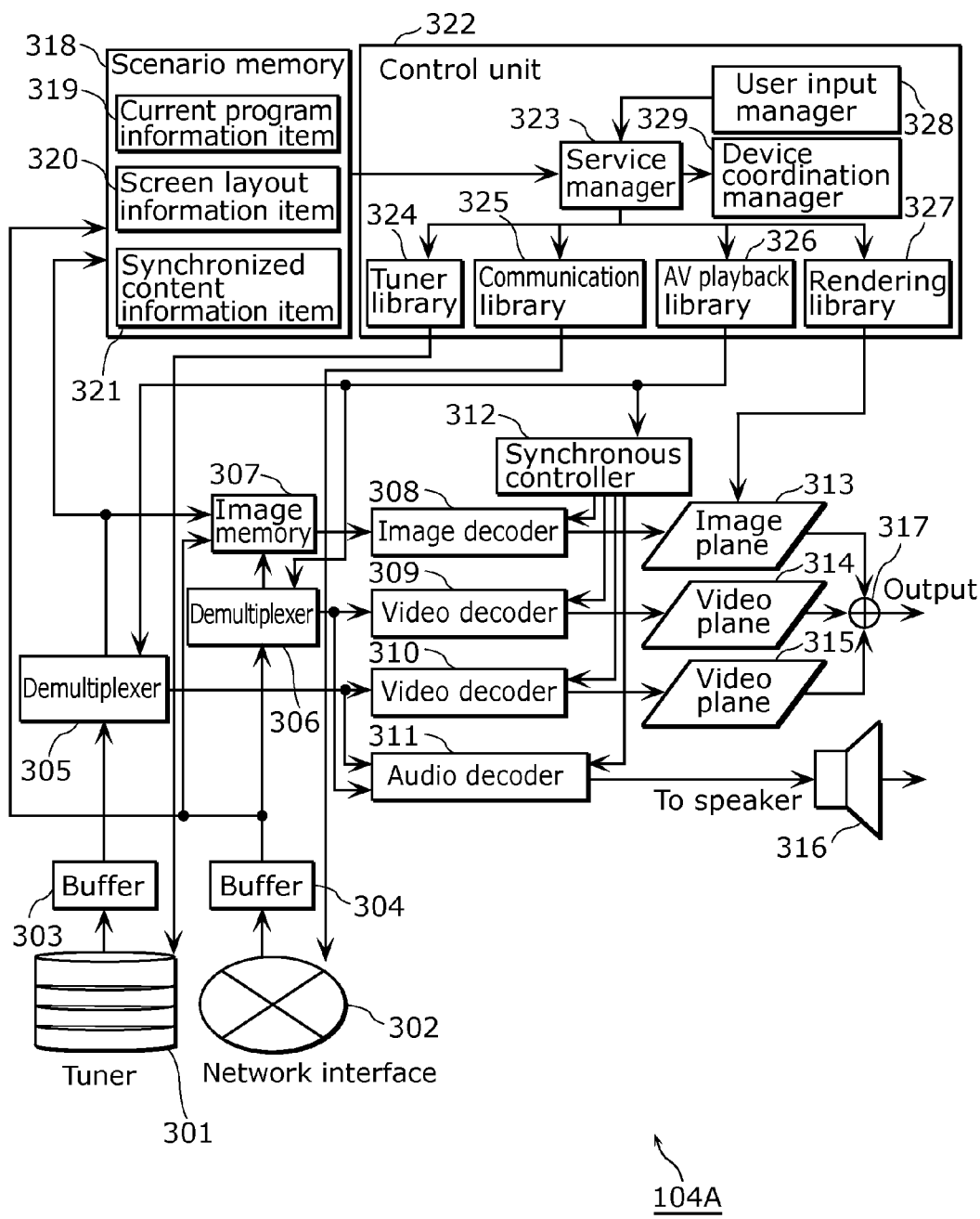
FIG. 9 is a block diagram illustrating an internal configuration of a broadcast receiving apparatus according to Embodiment 2.

FIG. 9 is a block diagram illustrating an internal configuration of the broadcast receiving apparatus according to Embodiment 2.

As illustrated in FIG. 9, a broadcast receiving apparatus 104A corresponds to one of the broadcast receiving apparatuses 10A to 10D according to Embodiment 1, and includes a tuner 301, a network interface 302, buffers 303 and 304, demultiplexers 305 and 306 an image memory 307, an image decoder 308, video decoders 309 and 310, an audio decoder 311, a synchronous controller 312, an image plane 313, video planes 314 and 315, a speaker 316, an adder 317, a scenario memory 318, and a control unit 322. The scenario memory 318 is a memory for storing a current program information item 319, a screen layout information item 320, and a synchronization content information item 321. The control unit 322 includes a service manager 323, a tuner library 324, a communication library 325, an AV playback library 326, a rendering library 327, a user input manager 328, and a device coordination manager 329.

The tuner 301 receives broadcast waves, and accesses a broadcast content item. Accordingly, the tuner 301 receives the broadcast content item.

The network interface 302 is connected to the Internet connection 103, and receives a communication content item.

The buffer 303 is a memory for storing the broadcast content item received by the tuner 301.

The buffer 304 is a memory for storing the communication content item received by the network interface 302.

The demultiplexer 305 demultiplexes a transport stream included in the broadcast content item received by the tuner 301, and obtains information on broadcast programs, a video frame including a group of pictures (GOP), an audio frame, and image data such as a still image and subtitles. Furthermore, the demultiplexer 305 stores the information on broadcast programs in the scenario memory 318, outputs the video frame to the video decoder 310, and outputs the audio frame to the audio decoder 311. Furthermore, the demultiplexer 305 stores the image data in the image memory 307. The demultiplexing performed by the demultiplexer 305 includes transforming a transport stream (TS) packet into a packetized elementary stream (PES) packet.

The demultiplexer 306 demultiplexes the transport stream included in the communication content item received through the network interface 302, and obtains a video frame including a GOP, an audio frame, and image data such as a still image and subtitles. Furthermore, the demultiplexer 306 outputs the video frame to the video decoder 309, outputs the audio frame to the audio decoder 311, and stores the image data such as a still image and subtitles, in the image memory 307. The demultiplexing performed by the demultiplexer 306 includes transforming a TS packet into a PES packet.

The image memory 307 is a buffer for storing the image data such as a still image and subtitles that is read from the demultiplexer 305, the demultiplexer 306, or the buffer 304.

The image decoder 308 decodes the image data stored in the image memory 307, and writes the decoded image data (hereinafter referred to as an image) to the image plane 313. As a result of decoding the image data, the still image and subtitles appear on the display 203.

The video decoder 309 decodes the video frame output from the demultiplexer 306, and writes an uncompressed picture to the video plane 314.

The video decoder 310 decodes the video frame output from the demultipiexer 305, and writes an uncompressed picture to the video plane 315.

The audio decoder 311 decodes the audio frame output from the demultipiexer 305 or 306, and outputs uncompressed audio data.

The synchronous controller 312 controls the image decoder 308, the video decoders 309 and 310, and the audio decoder 311 so that the image, the video (pictures), and the audio data are output in synchronization with each other, using a time stamp for managing a time for decoding that is output from the demultiplexer 305 or 306.

The image plane 313 is a memory for storing an uncompressed image.

Each of the video planes 314 and 315 is a memory or storing an uncompressed picture.

The speaker 316 outputs voice data that is uncompressed audio data.

The adder 317 superimposes the uncompressed picture stored in the video plane 314 and the image stored in the image plane 313 on the uncompressed picture stored in the video plane 315, and outputs an image in which the pictures and the image are superimposed.

The scenario memory 318 is a memory for storing the current program information item 319, the screen layout information item 320, and the synchronization content information item 321.

The current program information item 319 is related to a program that is being played back, from among the program information items recorded in the buffer 303.

The screen layout information item 320 corresponds to the layout information 20 and the layout information 20a according to Embodiment 1, and is to be processed from among the screen layout information items stored in the buffer 303 or 304.

The synchronization content information item 321 corresponds to the synchronization information 21 according to Embodiment 1, and is to be processed from among the synchronization content information items stored in the buffer 303 or 304.

The control unit 322 is a microcomputer system including a ROM, a RAM, and a CPU, and a program for controlling the broadcast receiving apparatus 104A is recorded in the ROM. The functions of the service manager 323, the tuner library 324, the communication library 325, the AV playback library 326, the rendering library 327, and the remote control manager 328 are implemented by reading the program in the ROM into the CPU and with coordination between the program and hardware resources.

The service manager 323 obtains the current program information item 319 from the scenario memory 318, and tuning information including a frequency, using the tuner library 324. Furthermore, the service manager 323 obtains the screen layout information item 320 and the synchronization content information item 321 from the scenario memory 318. Furthermore, the service manager 323 causes the network interface 302 to obtain a communication content item (stream data and others) using the communication library 325. Furthermore, the service manager 323 implements a broadcast/communication integrating service by controlling the demultipiexers 305 and 306, the synchronous controller 312, and the image plane 313 using the AV playback library 326 and the rendering library 327.

The tuner library 324 obtains the tuning information such as a frequency, from the tuner 301.

The communication library 325 is used for downloading an additional broadcast content item published on the Internet. The additional broadcast content item is a content item that is not included in an original broadcast, and is, for example, an additional angle image, second sound channel, subtitles, special video, and an application program. The service manager 323 can download the additional broadcast content item published on the Internet to the buffer 304 or, for example, a local storage by controlling the communication library 325.

The AV playback library 326 implements an AV playback function in response to a function call from the service manager 323. Examples of the AV playback function include processes, such as starting playback, stopping playback, pause, canceling pause, canceling a still image function, playing back at a fast speed indicated by an immediate value, rewinding at a speed indicated by an immediate value, selecting voice, selecting a sub-image, and selecting an angle.

The rendering library 327 decodes the image data stored in the image memory 307 using the image decoder 308, and writes the decoded image data to the image plane 313. Furthermore, the rendering library 327 writes text or graphics to the image plane 313.

The user input manager 328 transmits, to the service manager 323, an input signal from a remote control or a touch panel that is communicated with the broadcast receiving apparatus 104A, that is, an input from the user.

The device coordination manager 329 detects a service executable by a device connected to the home network 105 or through coordination with a device, and notifies the device to execute the service. Accordingly, the coordination with a device is established.

The screen layout information item 320 or the synchronization content information item 321 to be used by the broadcast receiving apparatus 104A according to Embodiment 2 may be obtained via the Internet, that is, the Internet connection 103. Here, information indicating a location of a communication content item may be included in broadcast waves, or placed on a website of the broadcast station 101.

Furthermore, the tuner 301, the buffer 303, the demultiplexer 305, and the video decoder 310 according to Embodiment 2 correspond to the broadcast receiving and playback unit 11 according to Embodiment 1. Furthermore, the network interface 302, the buffer 304, the demultiplexer 306, and the video decoder 309 correspond to the communication receiving and playback unit 14 according to Embodiment 1. Furthermore, the tuner 301 and the buffer 303 correspond to the first information obtaining unit 12 and the location information obtaining unit 18 according to Embodiment 1. Furthermore, the synchronous controller 312 and the adder 317 correspond to the superimposing unit 15 according to Embodiment 1. Furthermore, the communication library 325 corresponds to the communication state obtaining unit 19 according to Embodiment 1, and the device coordination manager 329 corresponds to the information notifying unit 13 according to Embodiment 1. Furthermore, the user input manager 328 and the service manager 323 correspond to the viewing mode receiving unit 16 and the viewing mode determining unit 17 according to Embodiment 1, respectively.

Figure 10:
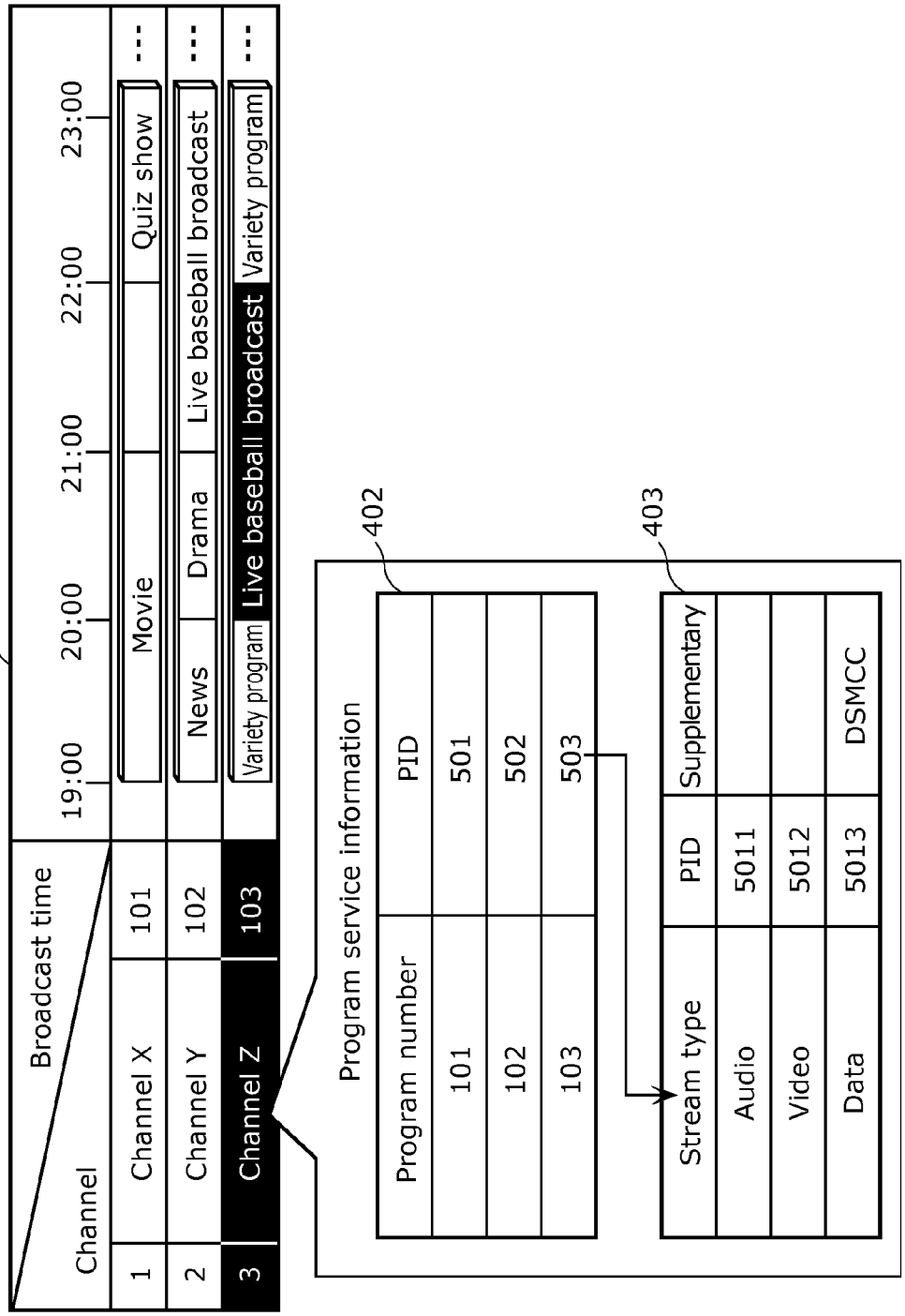
FIG. 10 illustrates an example of program list information according to Embodiment 2.

FIG. 10 illustrates an example of program list information.

Program list information 401 includes program information items stored in the buffer 303. The program list information 401 is arranged in table form, and includes channel identifiers, channel names, and program numbers. The program numbers are numbers for identifying a program map table (PMT) defined in the MPEG-2 standard.

Furthermore, the buffer 303 also stores program service information. The program service information includes a program association table (PAT) 402 and a program map table (PMT) 403 that are defined in the MPEG-2 standard. The PAT 402 indicates a program number and a packet ID (PID) for each broadcast program. The packet ID is used for obtaining the PMT 403. The PMT 403 is stored in the packet identified by the packet ID defined in the PAT 402, and is transmitted. The PMT 403 is composed of stream type, packet ID, and supplementary information. Each of audio, video, and data is referred to as an elementary stream, and includes packets transmitted with an identical ID. The supplementary information of the data indicates, for example, the digital storage media command and control (DSM-CC) written in ISO/IEC13818-6 that is a MPEG standard. Here, the details of DSM-CC will be omitted. DSM-CC defines a method for encoding a file system including directories and files used in a computer, in an MPEG-2 transport stream packet.

Figure 11:
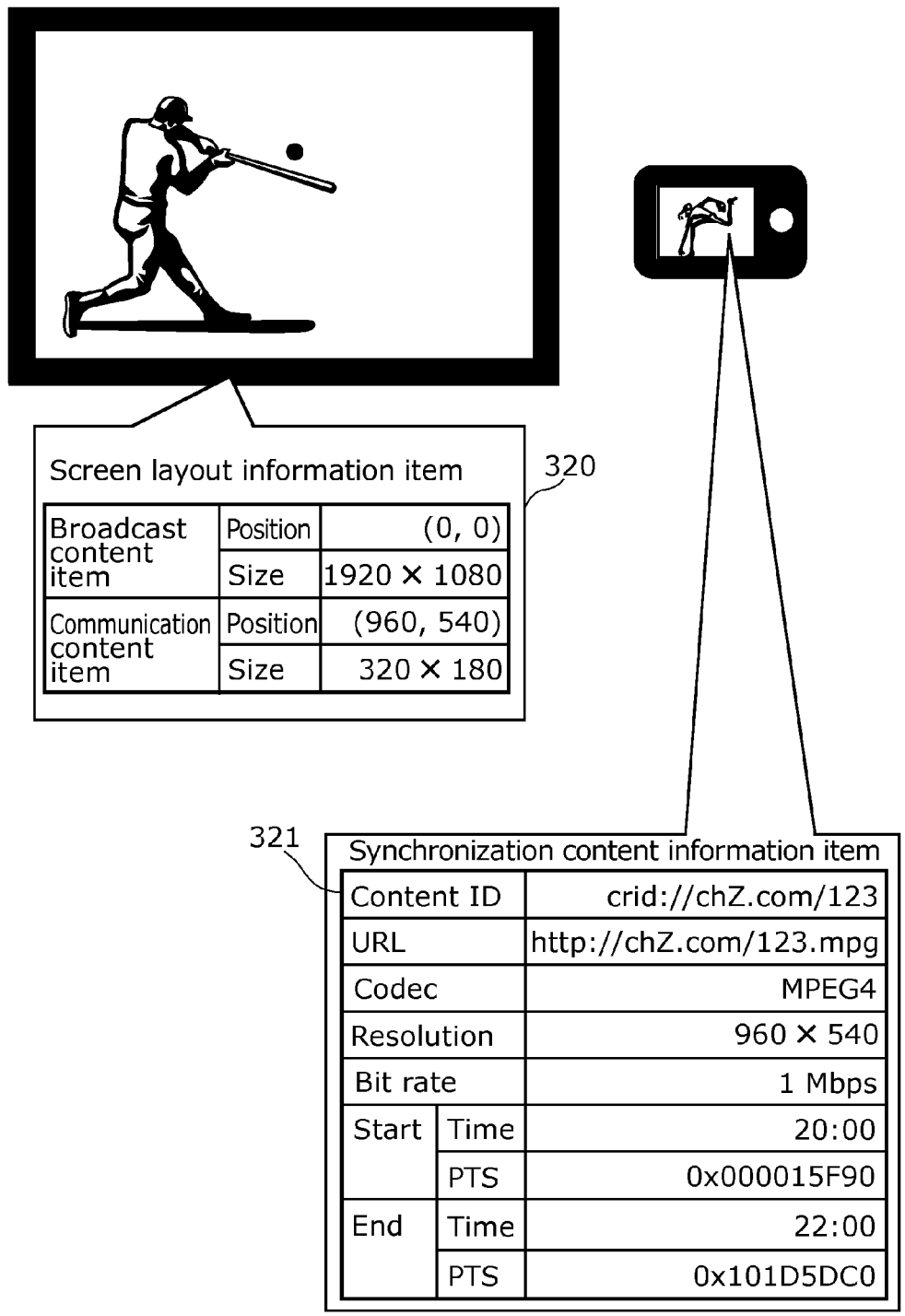
FIG. 11 illustrates an example of a screen layout information item and a synchronization content information item according to Embodiment 2.

FIG. 11 illustrates an example of a screen layout information item and a synchronization content information item.

The screen layout information item 320 indicates a position (display position) and a size (display size) of a broadcast content item, and a position (display position) and a size (display size) of a communication content item to be played back in synchronization with the broadcast content item. The screen layout information item 320 is used when a broadcast content item and a communication content item are viewed and displayed on one display apparatus or the display 203.

The synchronization content information item 321 indicates a content ID for identifying a communication content item, a URL indicating a location of the communication content item, a type of codec, a resolution, a bit rate, a start time, a start program time stamp (PTS), an end time, and an end PTS of the communication content item. The synchronization content information item 321 is broadcast, for example, with a broadcast content item. Thus, the content ID is associated with a broadcast content item and a communication content item. The broadcast receiving apparatus 104A identifies a source of a communication content item by a URL, and detects an attribute of the communication content item by the type of codec, resolution, and bit rate. Furthermore, the broadcast receiving apparatus 104A recognizes a relationship between a playback period and a playback time of a communication content item and a position of data in a stream included in the communication content item, using the start time, start PTS, end time, and end PTS. The screen layout information item 320 or the synchronization content information item 321 may be superimposed on broadcast waves (for example, embedded in a file system of DSM-CC), or placed in the server 102. When these information items are placed in the server 102, only link information for linking the server 102 may be superimposed on broadcast waves. The coordinate system of a position indicated by the screen layout information item 320 is not limited to an absolute coordinate system but may be a relative coordinate system. The synchronization content information item 321 may indicate types of codec, resolutions, and bit rates. In other words, the synchronization content information item 321 may indicate a content ID, a URL, and a type of codec for each communication content.

Figure 12:
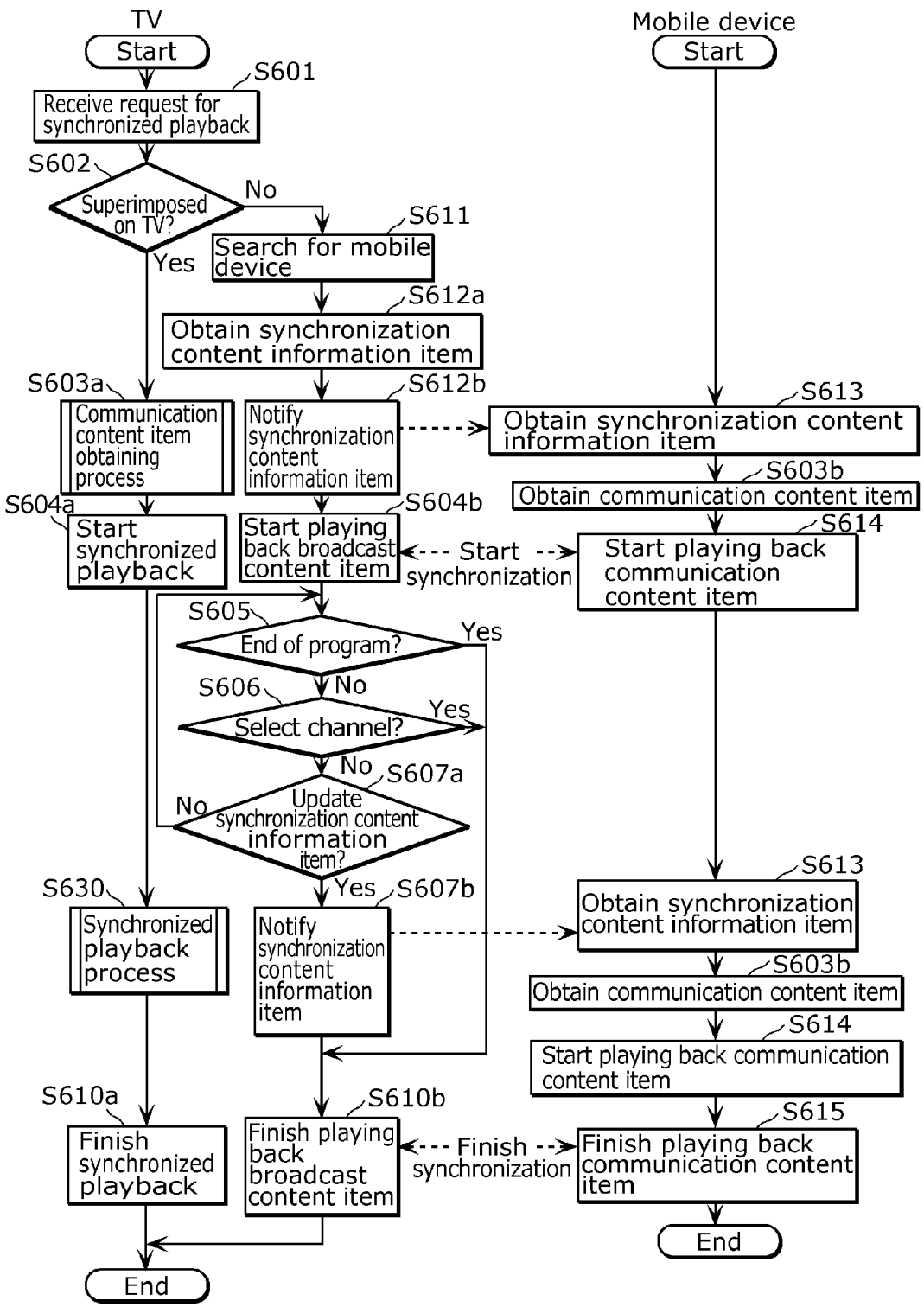
FIG. 12 is a sequence diagram showing an example of synchronized playback by a TV and a mobile device according to Embodiment 2.

FIG. 12 is a sequence diagram showing an example of the synchronized playback by the TV 104 and the mobile device 106. In this example, with the user's operation on the TV 104 during his/her viewing of a broadcast program, the TV 104 and the mobile device 106 play back a broadcast content item and a communication content item in synchronization with each other.

First, while the user views a broadcast program, the broadcast receiving apparatus 104A of the TV 104 receives, from the user, a request for synchronized playback of a broadcast content item and a communication content item (Step S601). Accordingly, the remote control manager 328 transmits user input information to the service manager 323. The service manager 323 determines whether or not the communication content item and the broadcast content item are superimposed and an image in which the communication content item and the broadcast content item are superimposed is output to the TV 104, according to presentation of a pop-up to the user or terminal setting information (Step S602). When it is determined at Step S602 that the communication content item and the broadcast content item are superimposed and the image in which the communication content item and the broadcast content item are superimposed is output to the TV 104 (Yes at Step S602), the service manager 323 starts obtaining the communication content item using the communication library 325, that is, starts a communication content item obtaining process (Step S603a). The details of the communication content item obtaining process will be described later.

When obtaining a data amount of the communication content item sufficient for synchronized playback of the broadcast content item and the communication content item, the service manager 323 specifies, for the AV playback library 326, a display size of the communication content item that is indicated by the screen layout information item 320 and requests the AV playback library 326 to play back the communication content item. The AV playback library 326 causes the synchronous controller 312 to match the PTS included in the broadcast content item and the PTS included in the communication content item, write the pictures included in the communication content item and the broadcast content item to the video plane 314 and the video plane 315, respectively, and superimpose and output an image in which the pictures are superimposed (Step S604a). Accordingly, the synchronized playback of the broadcast content item and the communication content item starts.

Upon start of the synchronized playback of the broadcast content item and the communication content item at Step S604a, the broadcast receiving apparatus 104A performs a synchronized playback process for appropriately continuing the synchronized playback (Step S630). When a predetermined condition is satisfied with the synchronized playback process, the broadcast receiving apparatus 104A finishes the synchronized playback of the broadcast content item and the communication content item (Step S610a).

On the other hand, when it is determined at Step S602 that the communication content item and the broadcast content item are not superimposed and the image in which the communication content item and the broadcast content item are superimposed is not output to the TV 104 (No at Step S602), the service manager 323 searches for a device (for example, the mobile device 106) that plays back the communication content item, using the device coordination manager 329 (Step S611). Then, the service manager 323 obtains the synchronization content information item 321 through the scenario memory 318 (Step S612a), and notifies the mobile device 106 that is the device obtained at Step S611 of the synchronization content information item 321 (Step S612b).

Next, the broadcast receiving apparatus 104A starts receiving a broadcast content item to be broadcast and starts playing back the broadcast content item, under control of the service manager 323 and the tuner library 324 (Step S604b). Next, the service manager 323 monitors whether or not the current time is the end time of a broadcast program that is the broadcast content item (Step S605). When it is determined at Step S605 that the current time is not the end time of the broadcast content item (No at Step S605), the service manager 323 monitors whether or not the user switches (selects) a channel (Step S606). When it is determined at Step S606 that the user does not switch a channel (No at Step S606), the service manager 323 further checks whether or not the synchronization content information item 321 is updated (Step S607a). When it is determined at Step S607a that the synchronization content information item 321 is not updated (No at Step S607a), the service manager 323 repeats the processes from Step S605. On the other hand, when it is determined at Step S607a that the synchronization content information item 321 is updated (Yes at Step S607a), the service manager 323 transmits the updated synchronization content information item 321 to the mobile device 106 by controlling the device coordination manager 329 (Step S607b). Then, the broadcast receiving apparatus 104A finishes playing back the broadcast content item (Step S610b).

The mobile device 106, that is, the playback apparatus included in the mobile device 106 obtains the synchronization content information item 321 notified from the TV 104 at Step S612b (Step S613). For example, the playback apparatus includes a device coordination manager, a service manager, a communication library, an AV playback library, a video decoder, and a video plane as the broadcast receiving apparatus 104A. When the device coordination manager of the playback apparatus obtains the synchronization content information item 321 at Step S613, it notifies the service manager included in the playback apparatus of the synchronization content information item 321. The service manager starts obtaining a communication content item using the communication library (Step S603b). When the service manager obtains a communication content item with a data amount sufficient for synchronized playback of the broadcast content item and the communication content item, it specifies a predetermined display size to the AV playback library of the playback apparatus and requests the AV playback library to play back the communication content item. The AV playback library writes a picture that corresponds to a start PTS and is included in the communication content item, to the video plane at a start time, and outputs the picture (Step S614). The start PTS and the start time are indicated in the synchronization content information item 321 obtained at Step S613. Accordingly, the synchronized playback of the broadcast content item and the communication content item starts between the TV 104 and the mobile device 106.

Furthermore, upon notification of the synchronization content information item 321 from the TV 104 at Step S607b, the playback apparatus performs the processes at Steps S613, S603b, and S614 again. In other words, the service manager of the playback apparatus obtains the synchronization content information item 321 using the device coordination manager (Step S613), and starts obtaining the communication content item again (Step S603b). After obtaining the communication content item again, the playback apparatus continues to play back the communication content item. Then, when it is determined at Step S605 that the broadcast program ends or when it is determined at Step S606 that the channel is switched, the service manager finishes playing back the communication content item (Step S615).

When only one of the communication content item obtained at Step S603a and the broadcast content item received at Step S604a has an audio frame or image data, the broadcast receiving apparatus 104A decodes and outputs the audio frame or the image data during the synchronized playback at Step S604a and S630. When both of the communication content item and the broadcast content item have an audio frame or image data, the broadcast receiving apparatus 104A recognizes one of the content items as a content item to be processed, during the synchronized playback at Step S604a and S630. Then, the broadcast receiving apparatus 104A decodes and outputs the audio frame or the image data included in the content item to be processed. Alternatively, the broadcast receiving apparatus 104A may recognize a content item to be processed, based on control information indicating whether or not an image is output in parallel with the synchronized playback or based on information indicating details of the content item to be processed. Furthermore, the broadcast receiving apparatus 104A may recognize a content item to be processed according to the display size of a video represented by each of a communication content item and a broadcast content item.

In the flowchart of FIG. 12, when a channel is switched or a broadcast content item ends, the TV 104 or the mobile device 106 automatically stops the communication content item. However, even in such a case, the TV 104 or the mobile device 106 may continue to play back a broadcast content item that is another broadcast program, and when a communication content item corresponding to the other broadcast program is present, it may continue to play back the broadcast content item and the communication content item in synchronization with each other. When authentication for billing and others are necessary in viewing a communication content item, the TV 104 or the mobile device 106 may temporarily suspend playback of the communication content item and again play back the communication content item after completion of the user authentication.

Furthermore, the TV 104 and the mobile device 106 may share the synchronization content information item 321 and EPG information (for example, the program list information) upon start of the coordination with a device, for example. Here, each of the TV 104 and the mobile device 106 estimates a playback position of a broadcast content item from the EPG information and the current time. Alternatively, each of the TV 104 and the mobile device 106 identifies the playback position of the broadcast content item by adding, to the server 102, information for identifying the playback position of the broadcast content item (for example, the EPG information and the synchronization content information item 321). As a result, each of the TV 104 and the mobile device 106 can obtain a communication content item at an appropriate playback position, and play back a broadcast content item and the communication content item in synchronization with each other. Furthermore, the broadcast receiving apparatus 104A may play back a broadcast content item and a communication content item in synchronization with each other by transferring the obtained communication content to the mobile device 106.

Figure 13:
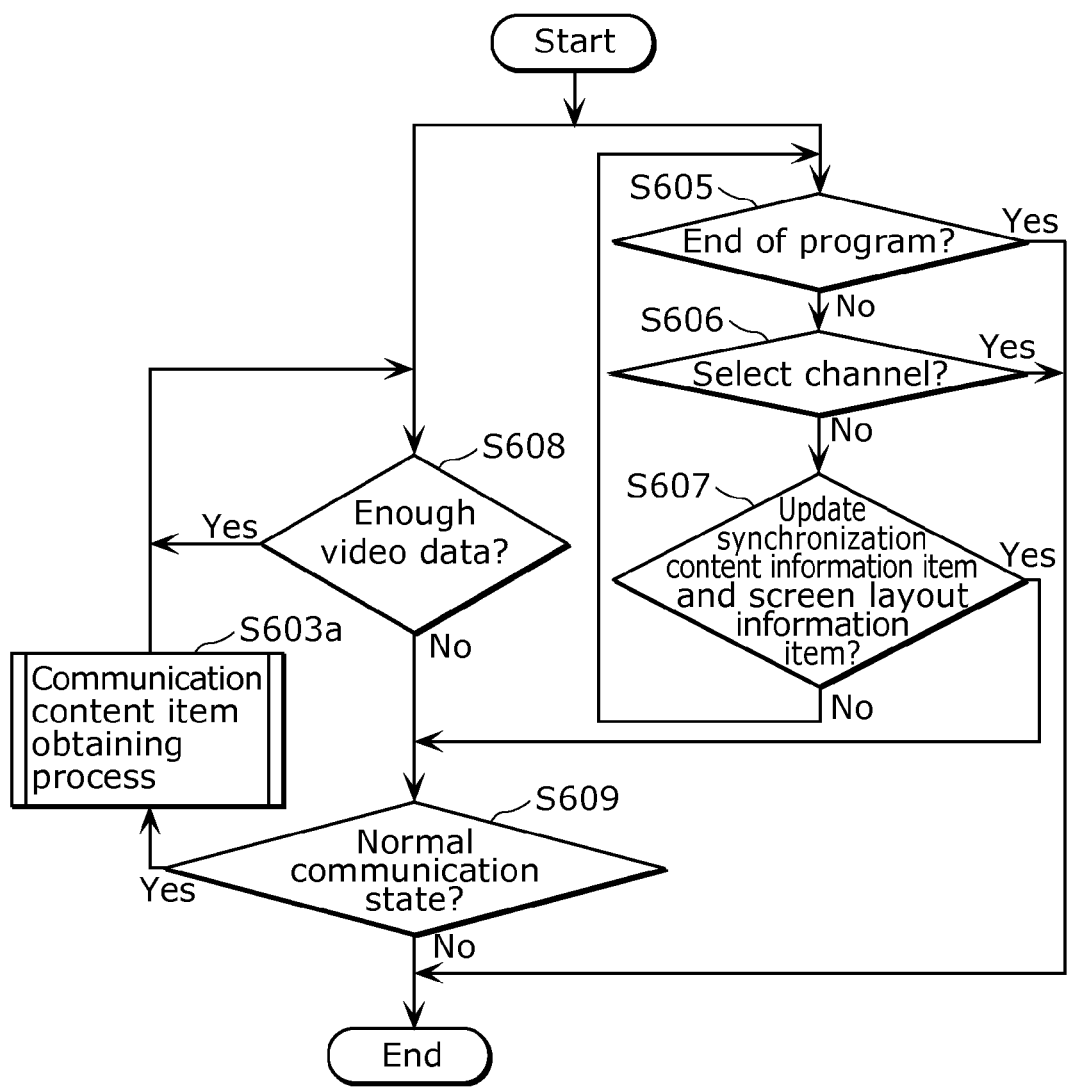
FIG. 13 is a flowchart indicating details of a synchronized playback process according to Embodiment 2.

FIG. 13 is a flowchart indicating details of the synchronized playback process at Step S630 in FIG. 12.

When the broadcast receiving apparatus 104A of the TV 104 performs the synchronized playback process at Step S630, it performs the first processes of Steps S605, S606, and S607 in parallel with the second processes of Steps S605, S609, and S603a.

In the first processes, the service manager 323 of the broadcast receiving apparatus 104A monitors whether or not the current time is the end time of the broadcast program as described above (Step S605). When it is determined at Step S605 that the current time is not the end time of the broadcast content item (No at Step S605), the service manager 323 monitors whether or not the user switches (selects) a channel (Step S606). When it is determined at Step S606 that the user does not switch a channel (No at Step S606), the service manager 323 further checks whether or not at least one of the synchronization content information item 321 and the screen layout information item 320 is updated (Step S607). When it is determined at Step S607 that the synchronization content information item 321 and the screen layout information item 320 are not updated (No at Step S607), the service manager 323 repeats the processes from Step S605. On the other hand, when it is determined at Step S607 that at least one of the synchronization content information item 321 and the screen layout information item 320 is updated (Yes at Step S607), the service manager 323 performs the process at Step S609 included in the second processes.

In the second processes, the service manager 323 checks whether or not video data of each of the broadcast content item and the communication content item is enough in amount for synchronized playback (Step S608). When it is determined at Step S608 that the video data of each of the broadcast content item and the communication content item is enough in amount for synchronized playback (Yes at Step S608), the service manager 323 repeats the processes from Step S608.

When it is determined at Step S607 in the first processes that at least one of the synchronization content information item 321 and the screen layout information item 320 is updated (Yes at Step S607) or when it is determined at Step S608 that the video data of each of the broadcast content item and the communication content item is not enough in amount for synchronized playback (No at Step S608), the service manager 323 stores program information of the broadcast content item that is played back in synchronization with the communication content item in a memory, and then checks whether or not the communication state is normal (Step S609). When it is determined at Step S609 that the communication state is normal (Yes at Step S609), the service manager 323 performs the communication content item obtaining process at Step S603a and repeats the processes from Step S608.

Furthermore, when it is determined at Step S605 that the current time is the end time of the broadcast content item (Yes at Step S605), when it is determined at Step S606 that the user switches a channel (Yes at Step S606), or when it is determined at Step S609 in the second processes that the communication state is abnormal (No at Step S609), a predetermined condition in the synchronized playback process is satisfied. In other words, the broadcast receiving apparatus 104A finishes playing back the broadcast content item and the communication content item in synchronization with each other (Step S610a).

Figure 14:
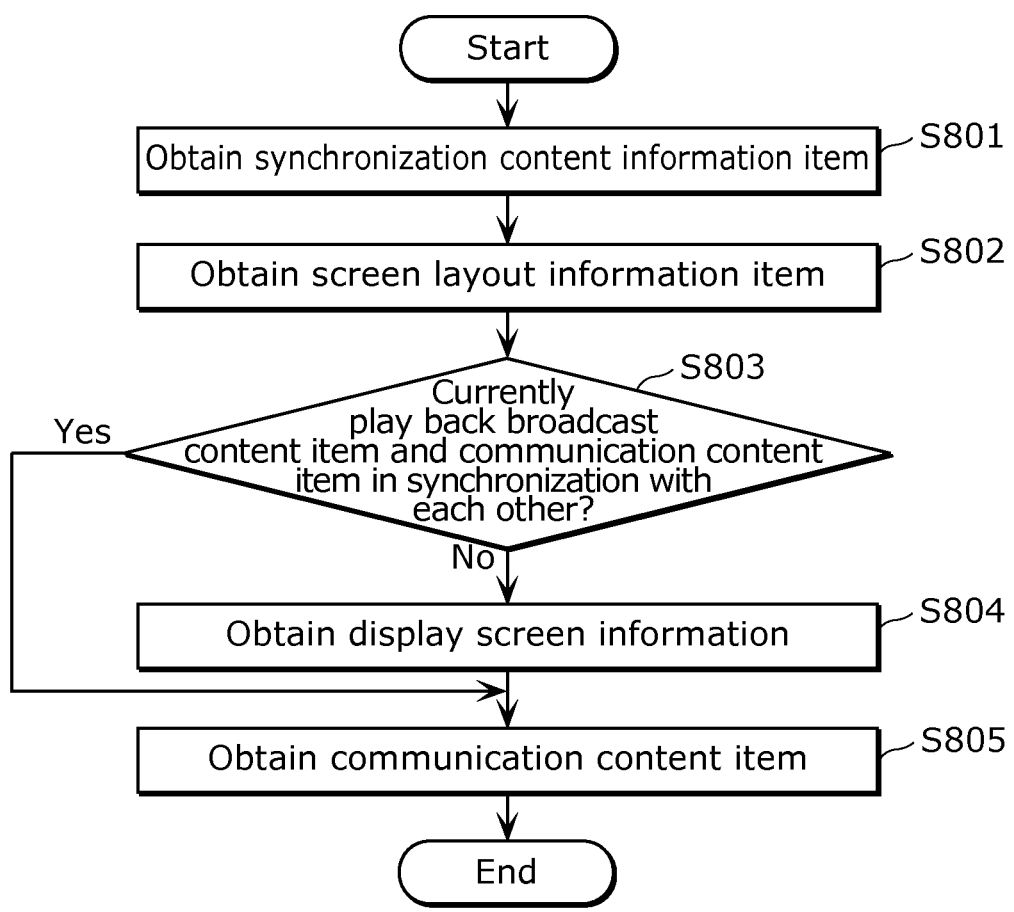
FIG. 14 is a flowchart indicating details of a communication content item obtaining process according to Embodiment 2.

FIG. 14 is a flowchart indicating details of the communication content tem obtaining process at Step S603a in FIG. 12.

First, the broadcast receiving apparatus 104A of the TV 104 obtains the synchronization content information item 321 superimposed on the broadcast waves (Step S801), and further obtains the screen layout information item 320 (Step S802). Next, the broadcast receiving apparatus 104A checks whether or not the broadcast content item and the communication content item are currently played back in synchronization with each other (Step S803). When it is determined at Step S803 that the broadcast content item and the communication content item are not currently played back in synchronization with each other (No at Step S803), the broadcast receiving apparatus 104A obtains display screen information indicating, for example, a resolution and a display size of the display 203 of the TV 104 (Step S804). Here, the synchronization content information item 321 obtained at Step S801 indicates video information, such as a bit rate for each of the communication content items. Here, the broadcast receiving apparatus 104A obtains the optimal communication content item, based on the synchronization content information item 321 obtained at Step S801, the screen layout information item 320 obtained at Step S802, and the display screen information obtained at Step S804 (Step S805). For example, the broadcast receiving apparatus 104A obtains a communication content item having the minimum definition (video information) described in the synchronization content information item 321, according to the display size of the display 203. When it is determined at Step S803 that the broadcast content item and the communication content item are currently played back in synchronization with each other (Yes at Step S803), the broadcast receiving apparatus 104A obtains the communication content item with high definition described in the synchronization content information item 321 (Step S805). However, the broadcast receiving apparatus 104A may change the definition of the communication content item obtained at Step S805, according to a load or a communication state.

Accordingly, it is possible to shorten a time period from a request for synchronized playback of the broadcast content item and the communication content item, according to an instruction of the user to start of the playback. Furthermore, when the communication content item is displayed in full screen mode during the synchronized playback of the broadcast content item and the communication content item, the content items with high definition can be presented to the user. The automatic recovery of resources of a communication content item according to a state of a broadcast content item allows assignment of resources to another service. When an error occurs in a communication content item, it is possible to prevent an inappropriate image from being presented to the user. Furthermore, the synchronized playback of the broadcast content item and the communication content item can be switched between synchronized playback solely by a device and synchronized playback by two devices. Furthermore, Embodiment 2 can produce the same advantages as those of Embodiment 1.

Figure 15:
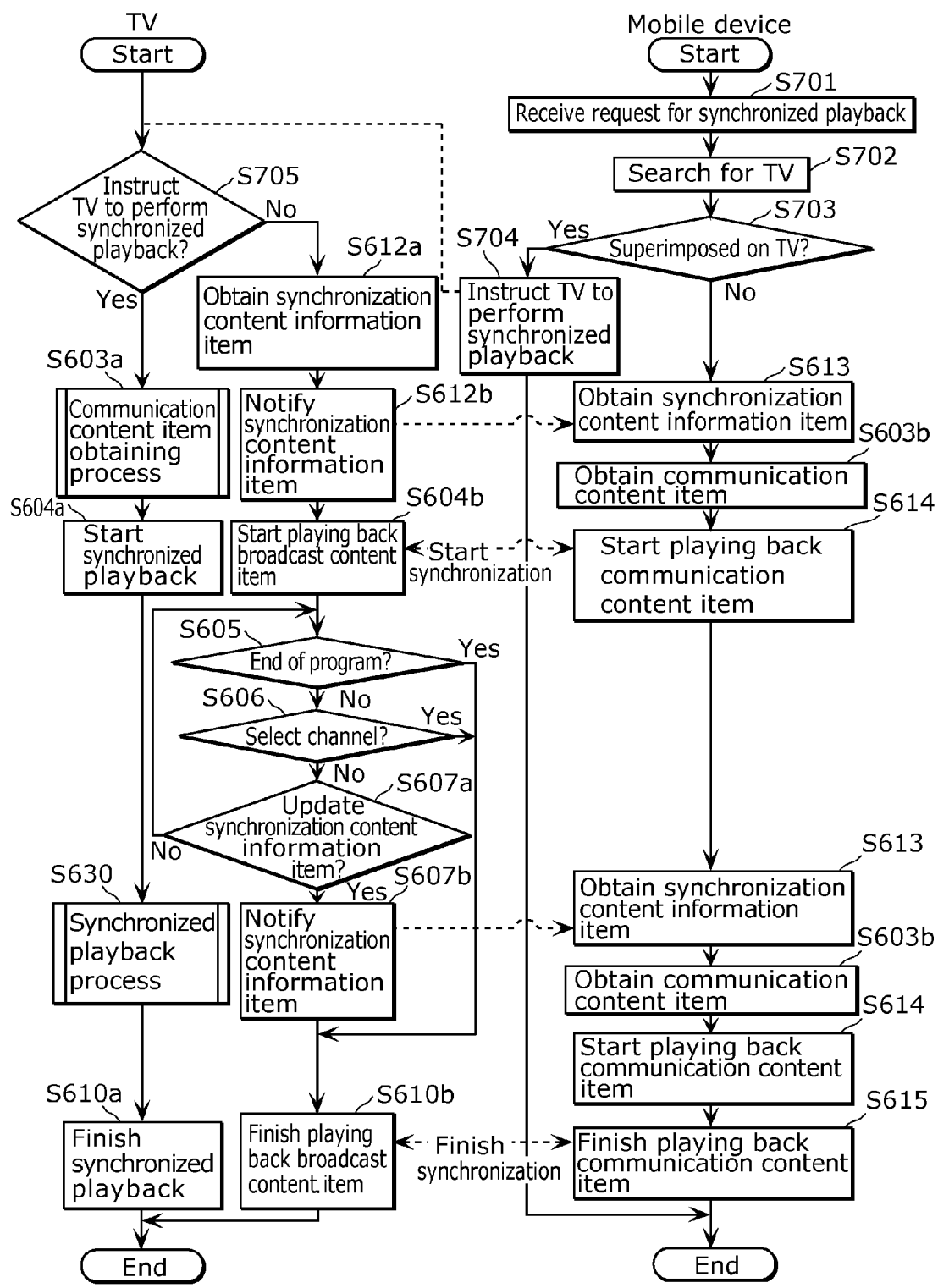
FIG. 15 is a sequence diagram showing another example of synchronized playback by a TV and a mobile device according to Embodiment 2.

FIG. 15 is a sequence diagram showing another example of the synchronized playback by the TV 104 and the mobile device 106. In this example, with the user's operation on the mobile device 106 during his/her viewing of a broadcast program on the TV 104, the TV 104 and the mobile device 106 play back a broadcast content item and a communication content item in synchronization with each other.

First, while the user views a broadcast program, the playback apparatus of the mobile device 106 receives, from the user, a request for synchronized playback of the broadcast content item and a communication content item (Step S701). Accordingly, the user input manager of the playback apparatus transmits the user input information to the service manager. The service manager of the playback apparatus searches for the TV 104 that is a device that plays back the broadcast content item, using the device coordination manager (Step S702). Furthermore, the service manager determines, according to presentation of a pop-up to the user or terminal setting information, whether or not the communication content item and the broadcast content item are superimposed and an image in which the communication content item and the broadcast content item are superimposed is output to the TV 104, that is, whether or not the TV 104 solely plays back the communication content item and the broadcast content item in synchronization with each other (Step S703). When it is determined at Step S703 that the communication content item and the broadcast content item are superimposed and the image in which the communication content item and the broadcast content item are superimposed is output to the TV 104 (Yes at Step S703), the service manager of the playback apparatus instructs the TV 104 to play back the communication content item and the broadcast content item in synchronization with each other, using the device coordination manager (Step S704). Furthermore, when the playback apparatus of the mobile device 106 finishes the process at Step S704, it finishes all the processes for the synchronized playback. Furthermore, when it is determined at Step S703 that the communication content item and the broadcast content item are not superimposed and the image in which the communication content item and the broadcast content item are superimposed is not output to the TV 104 (No at Step S703), the playback apparatus performs the processes at S613, S603a, and S614 in the same manner as FIG. 12, and finishes playing back the communication content item (Step S615).

On the other hand, the broadcast receiving apparatus 104A of the TV 104 determines whether or not the mobile device 106 instructs the TV 104 to perform the synchronized playback (Step S705). Here, when it is determined that the mobile device 106 instructs the TV 104 to perform the synchronized playback (Yes at Step S705), the broadcast receiving apparatus 104A performs the processes at S603a, S604a, S630, and S610a in the same manner as FIG. 12. On the other hand, when it is determined that the mobile device 106 does not instruct the TV 104 to perform the synchronized playback (No at Step S705), the broadcast receiving apparatus 104A performs the processes at S612a, S612b, S604b, S605, S606, S607a, S607b, and S610b in the same manner as FIG. 12.

(Variation 1)

Variation 1 of Embodiment 2 will be hereinafter described.

The synchronization content information item 321 according to Variation 1 indicates a broadcast type of a broadcast content item to be played back in synchronization with a communication content item. When obtaining the synchronization content information item 321, the broadcast receiving apparatus 104A according to Variation 1 performs playback according to the broadcast type.

FIG. 16 shows an example of the synchronization content information item 321 according to Variation 1.

The synchronization content information item 321 indicates a content ID and a URL of a communication content item, and a broadcast type 801 of a broadcast content item to be played back in synchronization with the communication content item. Specifically, the broadcast type 801 is a live broadcast (live) or an on-demand broadcast (video).

Figure 17:
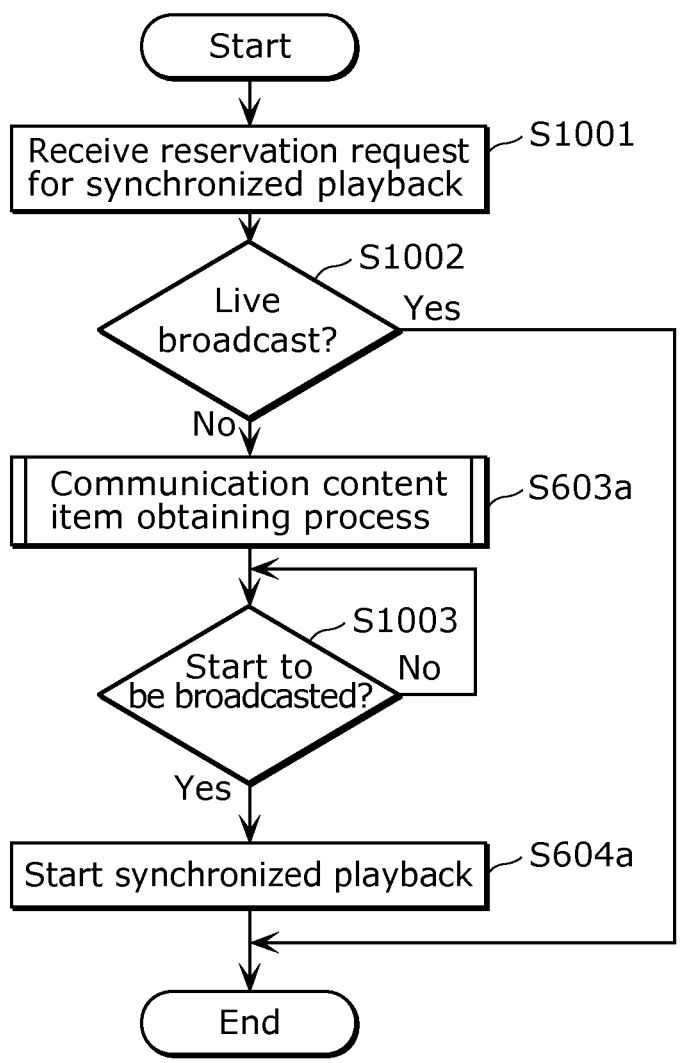
FIG. 17 is a flowchart indicating a playback process performed using a broadcast type by a broadcast receiving apparatus according to Variation 1 of Embodiment 2.

FIG. 17 is a flowchart indicating playback processes performed by the broadcast receiving apparatus 104A according to Variation 1, using the broadcast type 801.

The broadcast receiving apparatus 104A first receives a reservation request for synchronized playback (Step S1001). In other words, the user operates the TV 104 with reference to, for example, the program information to reserve automatic start of the broadcast content item and the communication content item. The broadcast receiving apparatus 104A checks whether or not the broadcast type 801 of the synchronization content information item 321 is a live broadcast (Step S1002). Here, when it is determined at Step S1002 that the broadcast type 801 is not a live broadcast (No at Step S1002), the broadcast receiving apparatus 104A performs the communication content item obtaining process at Step S603a. Here, when there is plenty of time until start of broadcasting of the broadcast content item, the broadcast receiving apparatus 104A may obtain a communication content item having high definition (quality).

After obtaining the communication content item with a data amount sufficient for synchronized playback, the broadcast receiving apparatus 104A monitors whether or not the broadcast program that is the broadcast content item starts to be broadcast (Step S1003). When it is determined at Step S1003 that the broadcast program starts to be broadcast (Yes at Step S1003), the broadcast receiving apparatus 104A starts the synchronized playback at Step S604a, that is, synchronized playback of the broadcast content item and the communication content item. When it is determined at Step S1003 that the broadcast program does not start to be broadcast (No at Step S1003), the broadcast receiving apparatus 104A waits until the broadcast program starts to be broadcast.

When the broadcast receiving apparatus 104A performs synchronized playback of the broadcast content item and the communication content item with the playback apparatus of the mobile device 106, once it is determined at Step S1003 that the broadcast program starts to be broadcast (Yes at Step S1003), the broadcast receiving apparatus 104A starts playing back the broadcast content item, which is the process at Step S604b.

With pre-obtainment of data of a communication content item according to a type of a broadcast content item, the broadcast receiving apparatus 104A can play back the broadcast content item in synchronization with the communication content item simultaneously when the broadcast content item starts to be broadcast.

The broadcast receiving apparatus 104A may play back the broadcast content item and the communication content item as 3D images, with synchronized playback of these content items. The playback is referred to as 3D playback or 3D display. For example, when an output device of the TV 104 supports 3D, the broadcast receiving apparatus 104A performs the 3D playback by outputting a broadcast content item as right-eye data and a communication content item as left-eye data. Here, the synchronization content information item 321 indicates that the broadcast content item and the communication content item that correspond to the synchronization content information item 321 are content items for 3D playback. Accordingly, the broadcast receiving apparatus 104A can preset the output for 3D playback (setting for alternately outputting the right-eye data and the left-eye data).

Furthermore, when data of a communication content item cannot be received due to a communication error at the time of 3D playback, the user may feel uncomfortable viewing an image displayed in the output setting for 3D playback. In such a case, the broadcast receiving apparatus 104A outputs the broadcast content item written in the video plane twice. Accordingly, the image to be displayed is visually recognized as a 2D image, and it is possible to lessen the uncomfortable feeling. Here, the broadcast receiving apparatus 104A may notify the user of switching to a 2D image due to a communication error in advance. Accordingly, the user can easily understand switching to a 2D image. Once the communication state is back from the abnormal state to the normal state, the broadcast receiving apparatus 104A resumes playback of a communication content item. In other words, the broadcast receiving apparatus 104A performs the 3D playback by alternately outputting the broadcast content item written in one of the video planes and the communication content item written in the other video plane. Furthermore, when the communication content item cannot be received due to a communication error or others and the 3D playback is interrupted midstream, the broadcast receiving apparatus 104A holds the time at which the 3D playback has been interrupted. When the broadcast receiving apparatus 104A is back to a state capable of receiving a broadcast content item, it may resume the 3D playback from the image at the held time that is an image missed by the user.

(Variation 2)

Variation 2 of Embodiment 2 will be hereinafter described.

The synchronization content information item 321 according to Variation 2 indicates information on interlocking data to be interlocked with a communication content item and displayed. When obtaining the synchronization content information item 321, the broadcast receiving apparatus 104A or the playback apparatus according to Variation 2 performs playback according to the information on the interlocking data.

FIG. 18 shows an example of the synchronization content information item 321 according to Variation 2.

The synchronization content information item 321 indicates a content ID and a URL of a communication content item, and further information 1101 on the interlocked data to be interlocked with the communication content item and displayed. Specifically, the information 1101 is information for enabling automatic playback or output of the interlocking data, such as the image data, at a designated time to be interlocked with the communication content item. The broadcast receiving apparatus 104A obtains the interlocking data identified by the name indicated in the information 1101 at the time indicated in the information 1101 through broadcasting or the Internet connection 103, and plays back or outputs the interlocking data. The interlocking data includes a still image, subtitles, and sound effect, and is, for example, played back in synchronization with video data of a communication content item on a per frame unit basis.

The broadcast receiving apparatus 104A and the playback apparatus may relay-broadcast a broadcast content item and a communication content item in coordination with each other. For example, there are cases where during the time when the user views a night baseball game that is being broadcast live, although the baseball game is actually continued, the broadcast is discontinued. Here, the broadcast receiving apparatus 104A and the playback apparatus obtain and play back a communication content item as a continuation of the broadcast (broadcast content item). Furthermore, when superimposing smaller moving images of the communication content item in front of larger moving images of the broadcast content item and outputting the moving images, once the broadcast ends, the broadcast receiving apparatus 104A may change the display size of the communication content item to the full screen size and continuously play back the communication content item as a continuation of the broadcast. Furthermore, upon notification from the broadcast receiving apparatus 104A, the playback apparatus may obtain information indicating a location of a communication content item corresponding to a continuation of the broadcast, obtain the communication content item from the location, and play back the communication content item as the continuation of the broadcast.

(Variation 3)

Variation 3 of Embodiment 2 wily be hereinafter described.

A broadcast receiving apparatus according to Variation 3 obtains not only the screen layout information item 320 and the synchronization content information item 321 but also an application program (hereinafter also referred to as "application"). In other words, the broadcast receiving apparatus according to Variation 3 plays back a broadcast content item and a communication content item in synchronization with each other according to the application. Accordingly, broadcasters and telecommunications carriers which distribute an application can set processing against a communication error to the broadcast receiving apparatus according to Variation 3.

Figure 19:
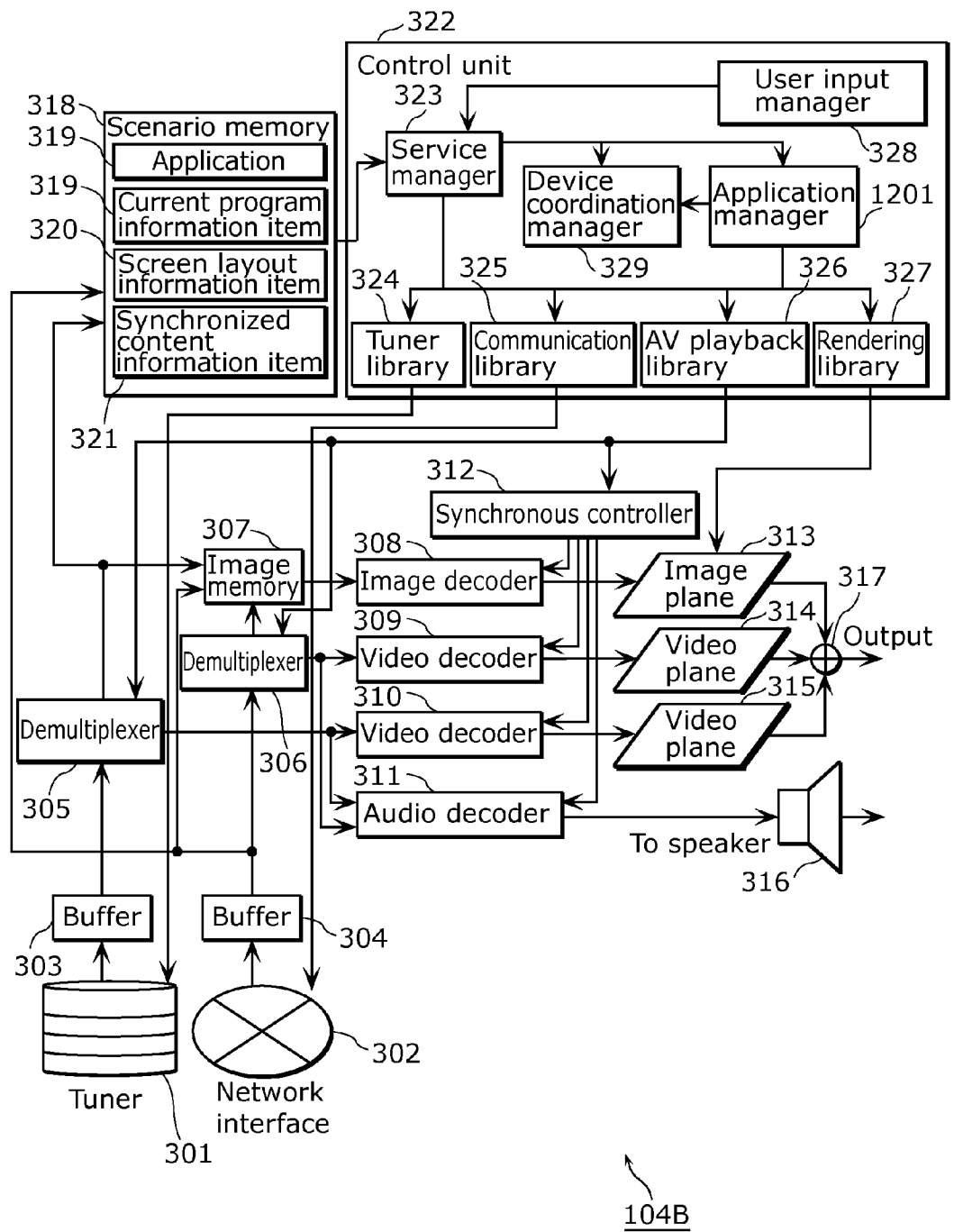
FIG. 19 illustrates an internal configuration of a broadcast receiving apparatus according to Variation 3 of Embodiment 2.

FIG. 19 is a block diagram illustrating an internal configuration of a broadcast receiving apparatus according, to Variation 3.

As illustrated in FIG. 19A, a broadcast receiving apparatus 104B according to Variation 3 includes all the constituent elements included in the broadcast receiving apparatus 104A according to Embodiment 2, and additionally includes an application manager 1201. The application manager 1201 manages starting up and closing of an application 1202 superimposed on broadcast waves with DSM-CC. Alternatively, the application manager 1201 obtains the application 1202 superimposed on the broadcast waves through communication, using location information of the application 1202, and manages starting up and closing of the application 1202. Here, the obtained application 1202 is stored in the scenario memory 318, and the application manager 1201 is included in the control unit 322. Then, the application manager 1201 reads the application 1202 stored in the scenario memory 318, and starts up and closes the application 1202.

The language of the application 1202 may be any. In other words, the application 1202 may be written in Java®, HTML, or BML. The service manager 323 of the broadcast receiving apparatus 104B notifies the application 1202 of a communication error or update of the screen layout information item 320 or the synchronization content information item 321. Furthermore, the service manager 323 of the broadcast receiving apparatus 104B may instruct the application 1202 to play back the broadcast content item and the communication content item in synchronization with each other, obtain a communication content item with a designated bit rate or resolution, obtain the screen layout information item 320 or the synchronization content information item 321, obtain the display screen information, switch between the broadcast content item and the communication content item, or present a switching function between display and non-display. Although the application manager 1201 according to Variation 3 is included in the broadcast receiving apparatus 104B, it may be included in the playback apparatus of the mobile device 106.

Although the broadcast receiving apparatus and the playback apparatus according to one or more aspects of the present invention are described based on Embodiments and Variations, the present invention is obviously not limited by these Embodiments and Variations. Without departing from the scope of the present invention, the aspects of the present invention include an embodiment with some modifications on Embodiments that are conceived by a person skilled in the art, and another embodiment obtained through combinations of the constituent elements of different Embodiments.

Furthermore, the present invention may be a computer program including a program code that operates a computer, or a digital signal including the computer program. In other words, each of the constituent elements according to each of Embodiments 1 and 2 may be implemented by dedicated hardware or by executing a software program appropriate for the constituent element. Each of the constituent elements may be implemented by a program executing unit, such as a CPU and a processor, reading and executing the software program recorded on a recording medium, such as a hard disk and a semiconductor memory.

Here, the software that implements the broadcast receiving apparatus according to each of Embodiments 1 to 2 is the following program. In other words, the program is a program for receiving a broadcast content item to be broadcast, and the program causes a computer to execute: obtaining synchronization information for playing back, in synchronization with playback of the broadcast content item, a communication content item to be distributed through communication other than broadcasting; notifying a playback apparatus that plays back the communication content item of the synchronization information; and receiving and playing back the broadcast content item.

Furthermore, the software that implements the playback apparatus according to each of Embodiments 1 to 2 is the following program. In other words, the program is a program for playing back a communication content item to be distributed through communication other than broadcasting, and the program causes a computer to execute: obtaining synchronization information for playing back the communication content item in synchronization with playback of a broadcast content item to be broadcast; and receiving and playing back the communication content item according to the obtained synchronization information.

Furthermore, the present invention may be implemented by recording the computer program or the digital signal on a computer-readable recording medium, such as a flexible disk, a hard disk, a CD-ROM, an MO, a DVD, a DVD-ROM, a DVD-RAM, and a Blu-ray Disc (BD), and a semiconductor memory.

Furthermore, the present invention may be implemented by transmitting the computer program or the digital signal through a telecommunication line, a wireless or wired communication line, or a network represented by the Internet.

Furthermore, the present invention may be implemented by another independent computer system recording the computer program or the digital signal on the recording medium and transporting the recording medium, or transferring the computer program or the digital signal via the network.

The present invention can be implemented by an LSI that controls the devices according to Embodiments. The functional blocks may be separately made into chips, or a part or an entire thereof may be made into one chip.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A field-programmable gate array (FPGA) that is programmable after manufacturing an LSI or a reconfigurable processor allowing reconfiguration of the connection or configuration of an LSI can be used for the same purpose.

In the future, with advancement in semiconductor technology, a brand-new technology may replace LSI. The functional blocks and components can be integrated using such a technology. The application of these techniques to biotechnology is one possibility.

Although a recording medium (semiconductor memory, such as HDD, SD card, CompactFlash®) is used as a readable and writable recording medium to which stored data is to be transferred, the features of the present invention do not depend on physical characteristics of the recording medium and the present invention is applicable to another readable and writable recording medium. For example, the same advantages can be obviously produced even when data is recorded on, for example, an external removable hard drive.

Although an apparatus having a playback function that superimposes a broadcast content item and a communication content item and plays back the content items is described in each of Embodiments, the present invention is applicable to a device not only having the playback function but also a recording function. Accordingly, Embodiments and Variations may be combined.

INDUSTRIAL APPLICABILITY

The broadcast communication system according to present invention produces an advantage of playing back a broadcast content item and a communication content item in synchronization with each other between a broadcast receiving apparatus and a playback apparatus, and is applicable to, for example, systems each including a television receiver and a mobile device.

REFERENCE SIGNS LIST 10A to 10D Broadcast receiving apparatus
11 Broadcast receiving and playback unit
12 First information obtaining unit
13 Information notifying unit
14 Communication receiving and playback unit
15 Superimposing unit
16 Viewing mode receiving unit
17 Viewing mode determining unit
18 Location information obtaining unit
19 Communication state obtaining unit
20 Synchronization information
21 Location information
30 Playback apparatus
31 Second information obtaining unit
32 Communication receiving and playback unit
101 Broadcast station
102 Server
103 Internet connection
104 TV
104A Broadcast receiving apparatus
104B Broadcast receiving apparatus
105 Home network
106 Mobile device
201 Broadcast content item
202 Communication content item
203 Display
204 Display
301 Tuner
302 Network interface
303 Buffer

304 Buffer
305 Demultiplexer
306 Demultiplexer
307 Image memory
308 Image decoder
309 Video decoder
310 Video decoder
311 Audio decoder
312 Synchronous controller
317 Image plane
314 Video plane
315 Video plane
316 Speaker
317 Adder
318 Scenario memory
319 Current program information item
320 Screen Layout information item
321 Synchronization content information item
322 Control unit
323 Service manager
324 Tuner library
325 Communication library
326 AV playback library
327 Rendering library
328 User input manager
329 Device coordination manager
401 Program list information
402 PAT
403 PMT
801 Broadcast type
1101 Information on interlocking data
1201 Application manager

The invention claimed is:

1. A broadcast receiving apparatus that receives a broadcast content item to be broadcast, the broadcast receiving apparatus comprising:
   a processor; and
   a non-transitory memory having stored thereon executable instructions, which when executed by the processor, cause the processor to perform:
      obtaining synchronization information for playing back a communication content item in synchronization with playback of the broadcast content item;
      receiving and playing back the broadcast content item;
      determining one of (i) a first viewing mode in which the broadcast content item and the communication content item are not displayed on a same device and (ii) a second viewing mode in which the broadcast content item and the communication content item are displayed 1 and 3 on the same device,
      when said determining determines the first viewing mode, (i) notifying a playback apparatus that plays back the communication content item of the synchronization information and (ii) transmitting the synchronization information to the playback apparatus,
   wherein the communication content item is distributed to the playback apparatus through communication other than broadcasting, such that when said determining determines the first viewing mode, the playback apparatus plays back the communication content item in synchronization with said playing back of the broadcast content item based on the synchronization information.

2. The broadcast receiving apparatus according to claim 1, wherein the executable instructions, which when executed by the processor, cause the processor to further perform receiving and play backing the communication content item when said determining determines the second viewing mode; and
   superimposing a communication video that is a video obtained through playing back of the communication content item and a broadcast video that is a video obtained through playing back of the broadcast content item, and outputting an image in which the communication video and the broadcast video are superimposed.

3. The broadcast receiving apparatus according to claim 2, wherein the executable instructions, which when executed by the processor, cause the processor to further perform receiving a viewing mode, and
   wherein said determining determines the one of the first viewing mode and the second viewing mode according to the received viewing mode irrespective of whether or not the broadcast content item and the communication content item are being played back.

4. The broadcast receiving apparatus according to claim 1, wherein the executable instructions, which when executed by the processor, cause the processor to further perform obtaining communication state information indicating a communication state of the playback apparatus other than the broadcasting, and
   wherein said notifying includes notifying the playback apparatus of other synchronization information for playing back the communication content item in synchronization with playback of a part of the broadcast content item, the part of the broadcast content item being played back by said receiving and play backing after a state indicated by the communication state information is switched from a reception capable state in which the communication content item can be received to a state in which the communication content item cannot be received, and is then switched back to the reception capable state, while said receiving and playing back plays back the broadcast content item.

5. The broadcast receiving apparatus according to claim 1, wherein the executable instructions, which when executed by the processor, cause the processor to further perform obtaining location information indicating a location of the communication content item,
   wherein the communication content item represents a video of a continuation of the broadcast content item, and
   wherein said notifying includes notifying the playback apparatus of the location information when said receiving and play backing finishes playing back the broadcast content item.

6. The broadcast receiving apparatus according to claim 1, wherein the executable instructions, which when executed by the processor, cause the processor to further perform obtaining location information indicating a location of the communication content item,
   wherein the communication content item represents a video identical to a video of the broadcast content item, and
   wherein said notifying includes notifying the playback apparatus of the location information upon receipt of an instruction from the playback apparatus after said receiving and play backing starts playing back the broadcast content item.

7. A broadcast receiving method for receiving a broadcast content item to be broadcast, the broadcast receiving method comprising:

obtaining synchronization information for playing back a communication content item in synchronization with playback of the broadcast content item;

receiving and playing back the broadcast content item;

determining one of (i) a first viewing mode in which the broadcast content item and the communication content item are not displayed on a same device and (ii) a second viewing mode in which the broadcast content item and the communication content item are displayed on the same device; and when said determining determines the first viewing mode, (i) notifying a playback apparatus that plays back the communication content item of the synchronization information and (ii) transmitting the synchronization information to the playback apparatus, wherein the communication content item is distributed to the playback apparatus through communication other than broadcasting, such that when said determining determines the first viewing mode, the playback apparatus plays back the communication content item in synchronization with said playing back of the broadcast content item based on the synchronization information.

8. A non-transitory computer-readable recording medium on which a program for receiving a broadcast content item to be broadcast is recorded, the program causing a computer to execute:

obtaining synchronization information for playing back a communication content item in synchronization with playback of the broadcast content item;

receiving and playing back the broadcast content item;

determining one of (i) a first viewing mode in which the broadcast content item and the communication content item are not displayed on a same device and (ii) a second viewing mode in which the broadcast content item and the communication content item are displayed on the same device; and when said determining determines the first viewing mode, (i) notifying a playback apparatus that plays back the communication content item of the synchronization information and (ii) transmitting the synchronization information to the playback apparatus, wherein the communication content item is distributed to the playback apparatus through communication other than broadcasting, such that when said determining determines the first viewing mode, the playback apparatus plays back the communication content item in synchronization with said playing back of the broadcast content item based on the synchronization information.

* * * * *